INVENTORS
WILLIAM B. GOLDSWORTHY
JOHN A. BUNNELL
BY Robert J. Schaap
ATTORNEY

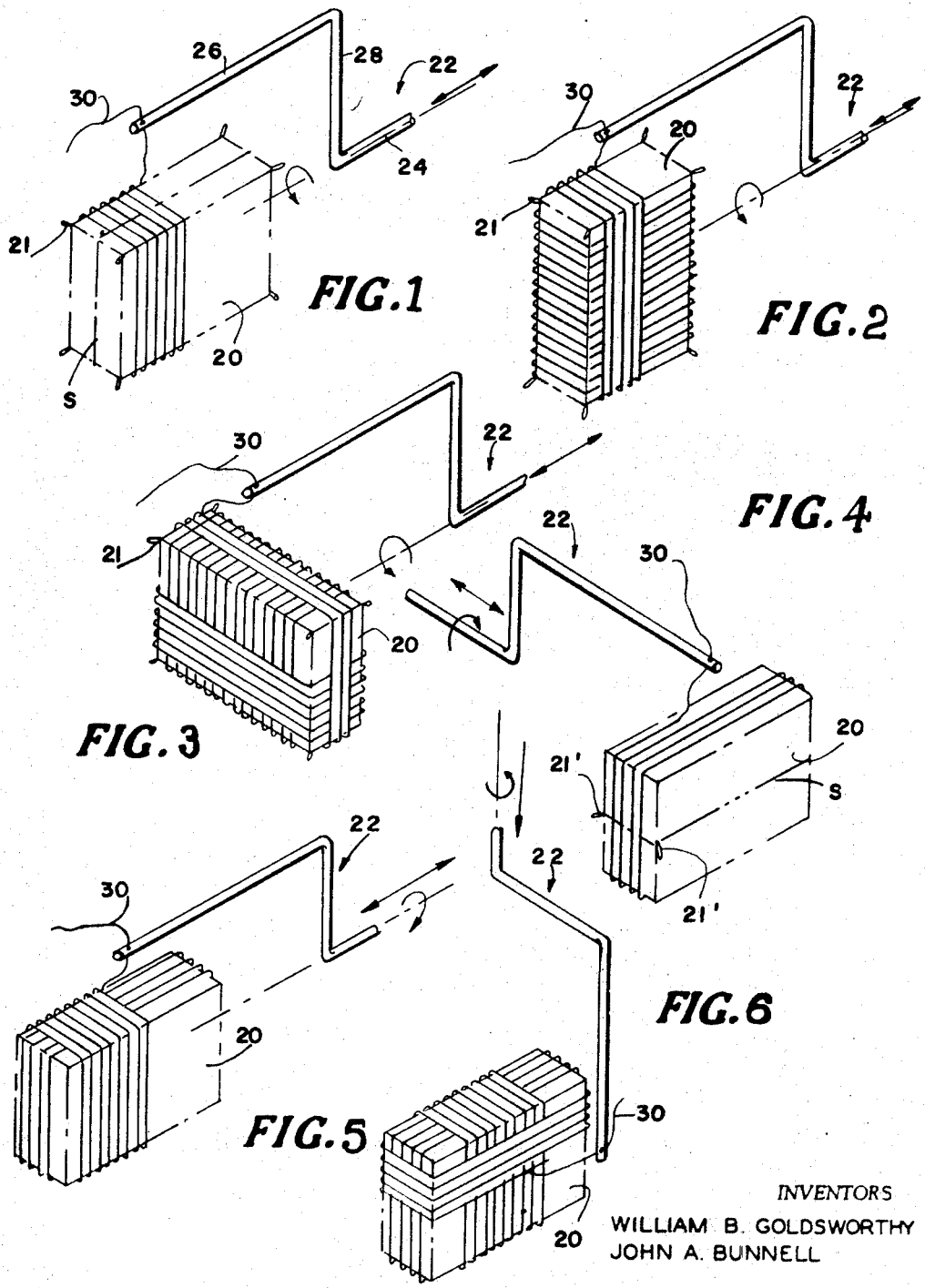

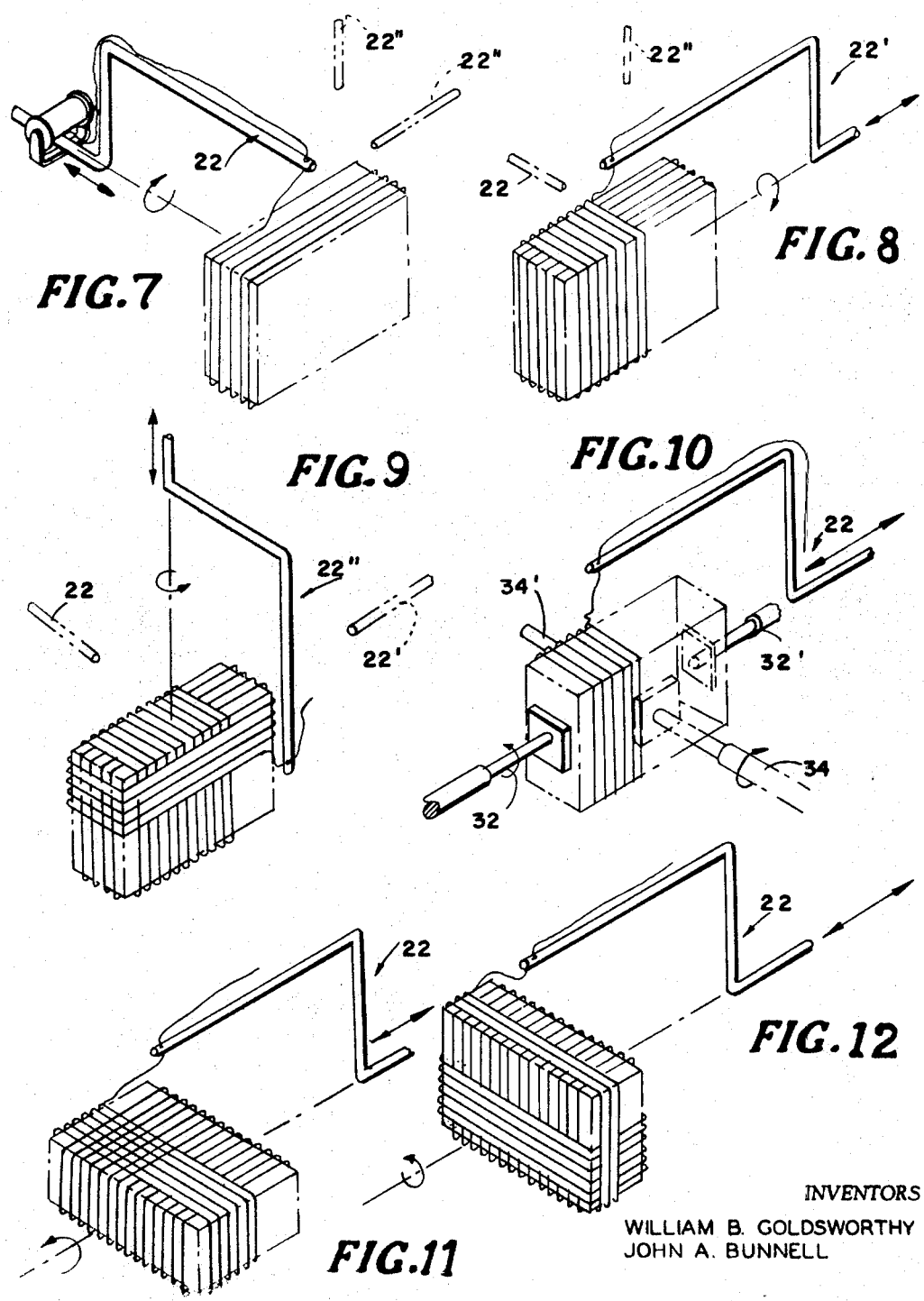

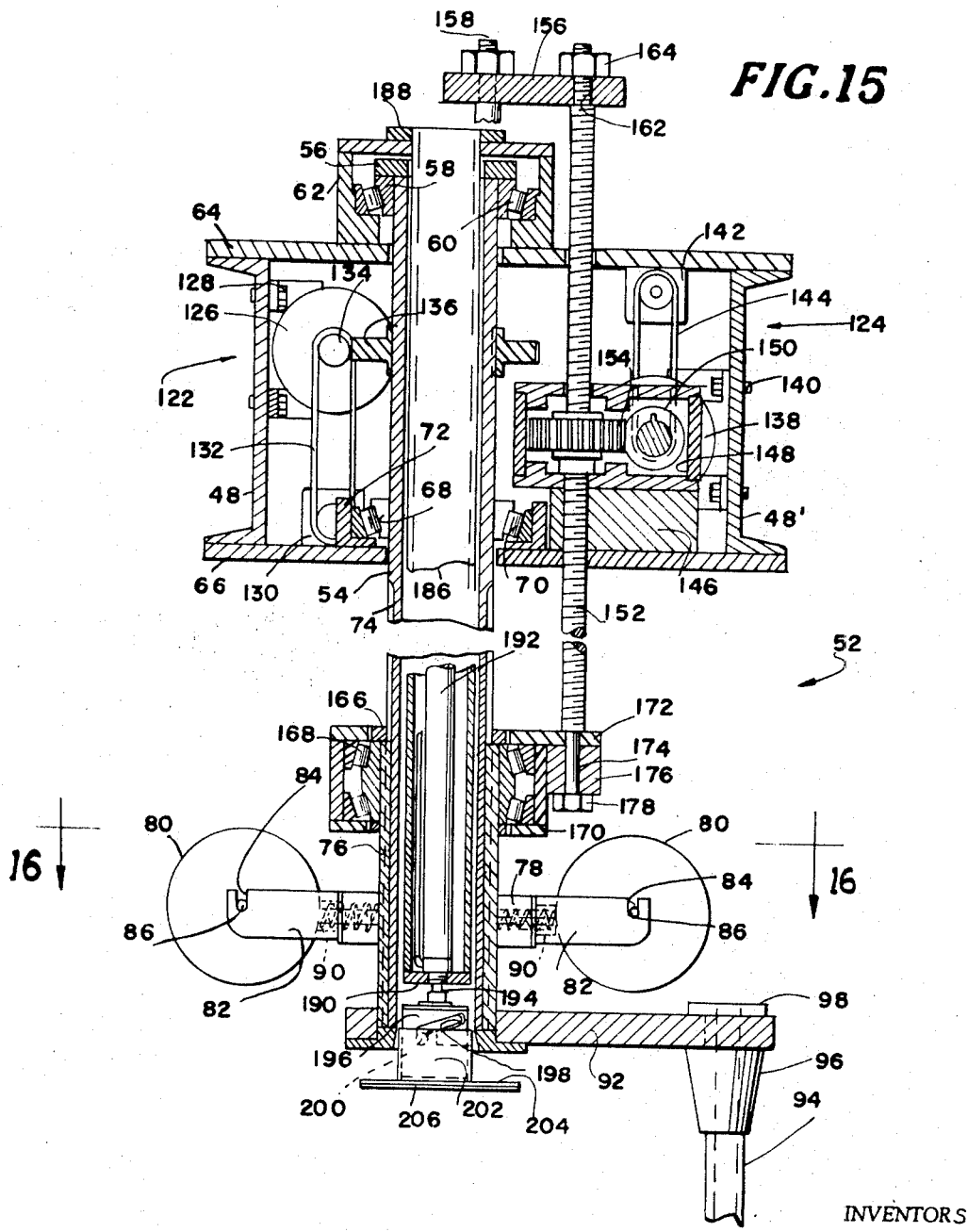

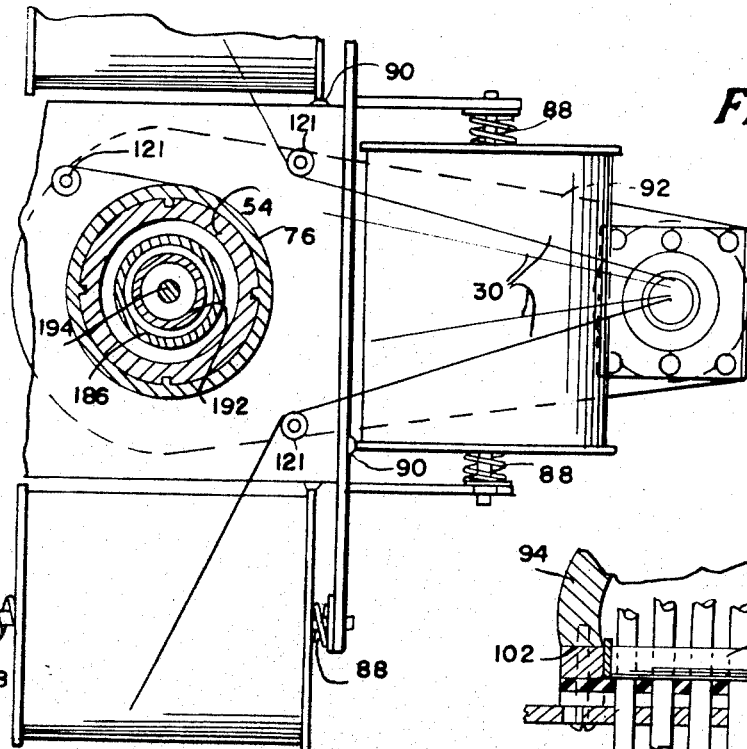
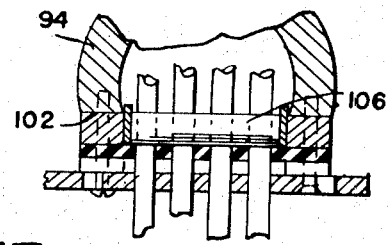
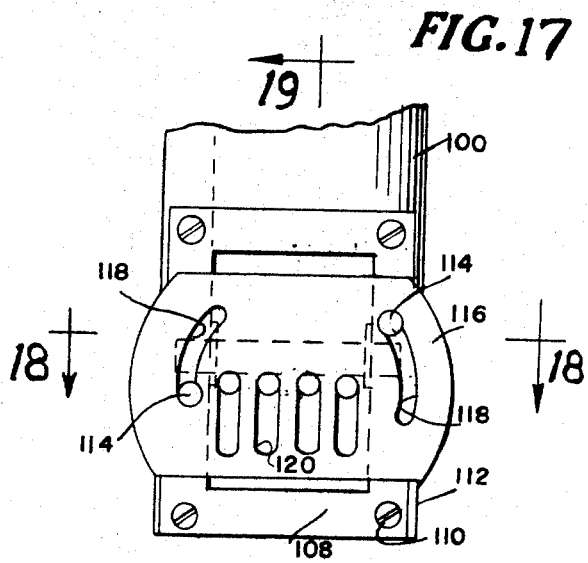
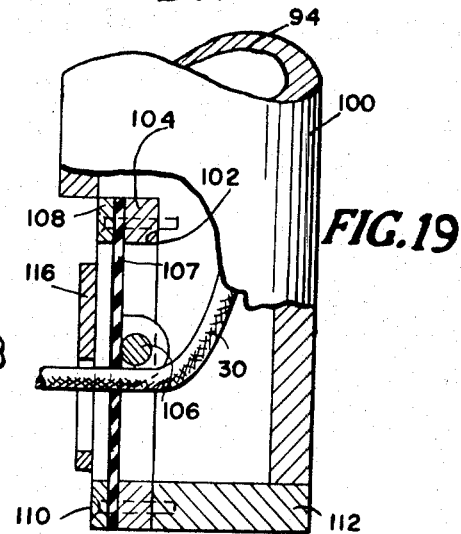
INVENTORS
WILLIAM B. GOLDSWORTHY
JOHN A. BUNNELL
BY *Robert J. Schaap*
ATTORNEY

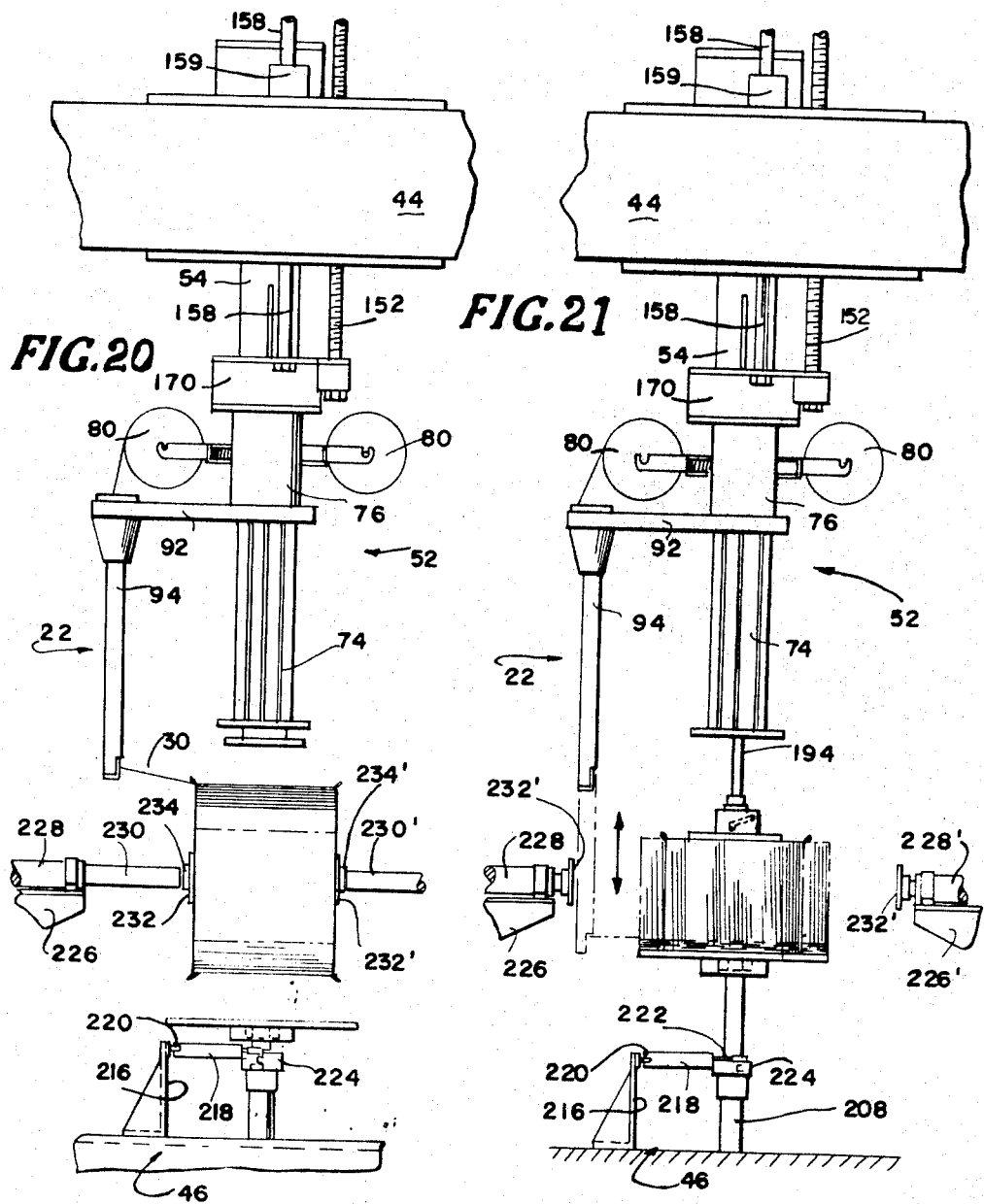

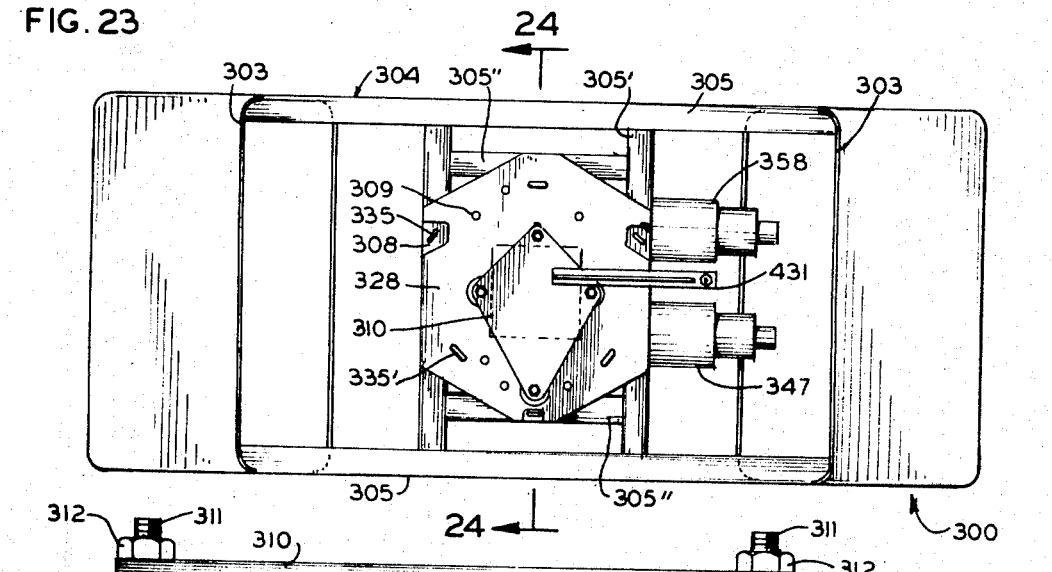
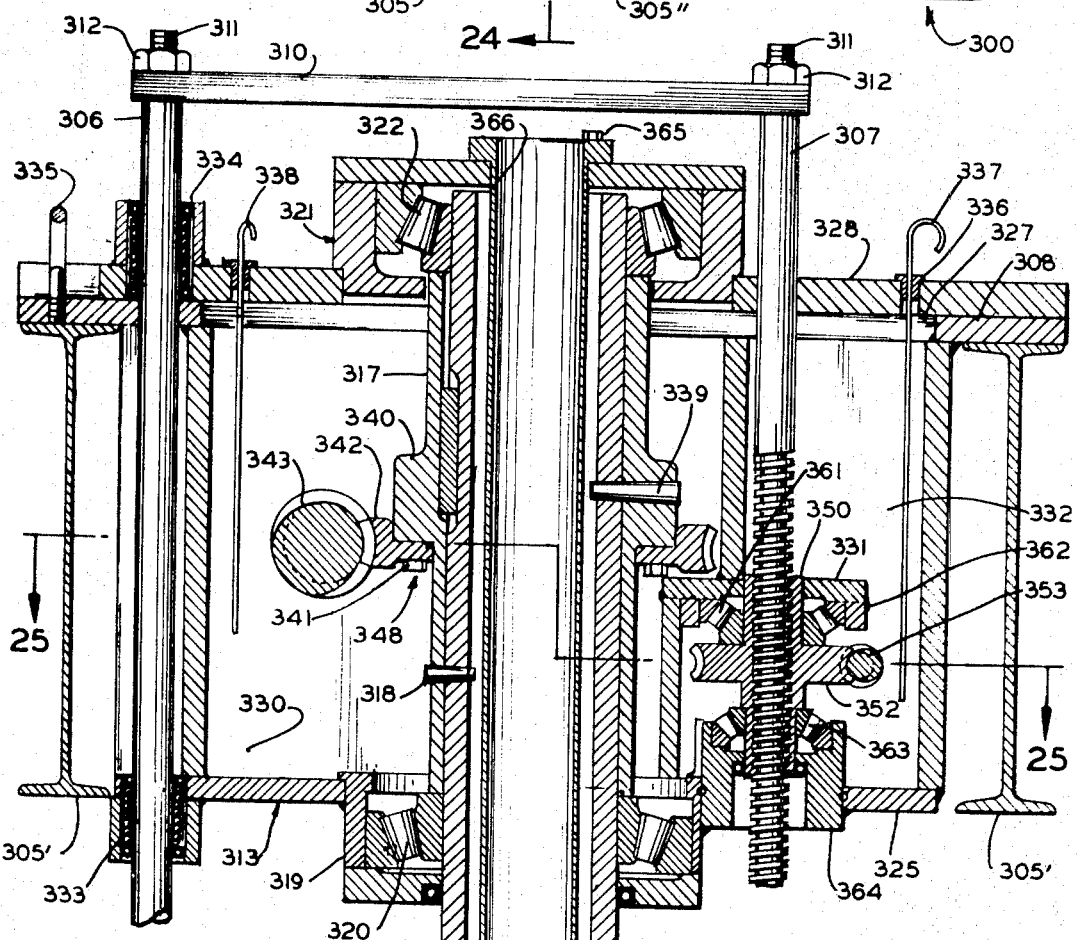

INVENTORS
WILLIAM B. GOLDSWORTHY
JOHN A. BUNNELL
BY
*Robert J. Schaap*
ATTORNEY

INVENTORS
WILLIAM B. GOLDSWORTHY
JOHN A. BUNNELL
BY
*Robert J. Schaap*
ATTORNEY

INVENTORS
WILLIAM B. GOLDSWORTHY
JOHN A. BUNNELL
BY
*Robert J Schaap*
ATTORNEY

INVENTORS
WILLIAM B. GOLDSWORTHY
JOHN A. BUNNELL
BY
Robert J. Schaap
ATTORNEY

INVENTORS
WILLIAM B. GOLDSWORTHY
JOHN A. BUNNELL
BY
*Robert J. Schaap*
ATTORNEY

INVENTORS
WILLIAM B. GOLDSWORTHY
JOHN A. BUNNELL
BY
Robert J. Schaap
ATTORNEY

INVENTORS
WILLIAM B. GOLDSWORTHY
JOHN A. BUNNELL
BY
*Robert J. Schaap*
ATTORNEY

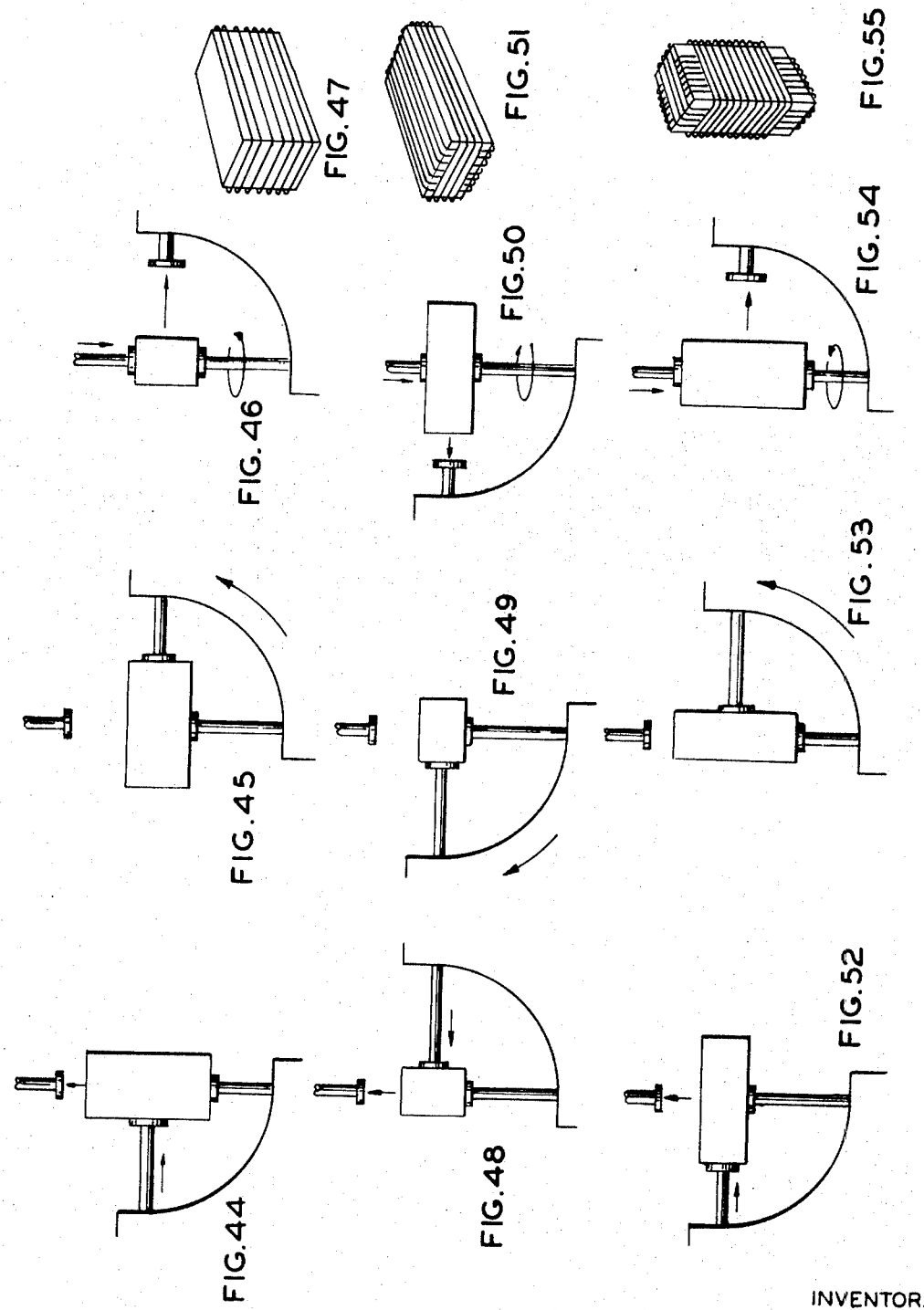

INVENTORS
WILLIAM B. GOLDSWORTHY
JOHN A. BUNNELL
BY Robert J. Schaap
ATTORNEY

INVENTORS
WILLIAM B. GOLDSWORTHY
JOHN A. BUNNELL
BY
*Robert J. Schaap*
ATTORNEY

United States Patent Office 3,740,285
Patented June 19, 1973

3,740,285
METHOD AND APPARATUS FOR FILAMENT WINDING ABOUT THREE AXES OF A MANDREL AND PRODUCTS PRODUCED THEREBY
William B. Goldsworthy, 2504 Novato Place, Palos Verdes Estates, Calif. 90274, and John A. Bunnell, 31186 Pedro St., South Laguna, Calif. 92677
Application Mar. 1, 1968, Ser. No. 709,676, now Patent No. 3,701,489, which is a continuation-in-part of application Ser. No. 591,387, Oct. 18, 1966, which in turn is a continuation of application Ser. No. 156,563, Nov. 29, 1961, both now abandoned. Divided and this application Apr. 23, 1970, Ser. No. 43,308
Int. Cl. B65h 81/02
U.S. Cl. 156—173                      17 Claims

ABSTRACT OF THE DISCLOSURE

An apparatus and method for winding Fiberglas filament about three axes of a substantially rectangular mandrel. Five basic methods are employed where the filament feeding head is rotatable and reciprocative with respect to the mandrel and where the mandrel is rotatable and reciprocative with respect to the filament feeding head. Similarly, one of the elements can be rotated and the other thereof can be reciprocatable. The winding apparatus includes a supporting table and a series of clamps which are designed to automatically shift and rotate the mandrel to the second and third axis positions for winding about the three axes of the mandrel. A second embodiment of the apparatus employs mandrel tables located at 90° planes with respect to each other. The mandrel tables serve as supports and also as clamping members for changing the position of the mandrel. A plug-in programming mechanism is also provided for operating the apparatus on an automatic basis.

---

This application is a division of my copending application, Ser. No. 709,676, filed Mar. 1, 1968, now U.S. Pat. No. 3,701,489 which is a continuation-in-part of my copending application Ser. No. 591,387, filed Oct. 18, 1966, now abandoned, which is in turn a continuation of my copending application Ser. No. 156,563, filed Nov. 29, 1961, now abandoned.

This invention relates to the manufacture of containers formed by winding continuous filaments under tension about a mandrel, the filament being impregnated with a bonding resin and subsequently cured, thereby forming a container shell of new and improved construction. There is accordingly provided by this invention a new and improved method and apparatus for forming the container, as well as a novel container structure.

Precision instruments and the like often require shipping containers which must withstand unusually severe and adverse stress and environmental conditions. There is accordingly a continuing demand for shipping containers constructed of such a character to require the container to be airtight, watertight, with virtually no moisture transmission through the structure, while retaining such properties after e.g. repeated drops from a 30 inch height onto a steel plate, at the container corners. Containers which meet such rigid standards are generally constructed from Fiberglas reinforced plastic by a method commonly referred to as pre-formed-matched metal die process.

This process normally involves the molding of random oriented chopped Fiberglas roving, bonded with a polyester resin. The physical properties of the containers formed by such techniques are such that extremely thick corners must be provided in order to meet the stringent specifications of the character described.

The technique of filament winding as a method of production of motor cases, pressure vessels, and similar hardware for the aerospace industry and other industries requiring containers meeting stringent specifications has enjoyed a rapid growth in the recent years. The strength-weight ratio is the paramount factor in production of containers produced by the filament winding technique. Furthermore, it has been found that containers produced by the filament winding techniques are less costly than containers which are molded or are produced by other methods.

Additionally, such prior art methods of forming containers present inspection and quality control problems in mass-production, which are difficult to evaluate by non-destructible testing techniques—and consequently, the containers have a highly undesirable reliability ratio.

There are a number of commercially available machines for filament winding about a mandrel for the production of containers. However, these previous filament winding machines have been applied solely to the manufacture of components that were surfaces of revolution. There have even been some attempts to produce a box-like structure by filament winding about a mandrel such as by the apparatus described in the A. Rausch Pat. No. 2,731,376. However, the commercially available apparatus for filament winding constitutes mere elaborations of conventional lathes for rotating a mandrel and shifting a roving strand with respect to a rotating mandrel. These devices are grossly inefficient and require constant manual attention in the production of containers thereon.

OBJECTS

It is accordingly an object of this invention to provide a new and improved method for forming containers, wherein a container shell is formed by winding a continuous filament under tension about a planar mandrel conforming to the desired interior dimension of the finished container. The filament is impregnated or coated with a bonding resin, the filament resin shell thence being treated as necessary to cure the bonding resin, thereby completing the structure. The mandrel is in the shape of a rectangular solid and the winding step is accomplished by relative rotation of the mandrel with respect to a filament feeding arm, there also being provided relative longitudinal movement so that the mandrel is continuously wrapped from one end thereof to the other. The impregnation or coating of the filament by the bonding resin may take place before or after the winding step.

Another object of this invention is to provide a new and improved apparatus for carrying out the winding step of the above-described method of forming containers, means being provided to wrap the opposed planar surfaces of the mandrel by a feeding arm. In this regard, driving means are provided for rotating and reciprocating the feeding arm, together with means for supporting the mandrel and changing the position thereof with respect to the apparatus. To this end, there is provided a stationary frame which carries a vertically movable and rotatable filament feeding arm axially offset from the axis of rotation so as to effectively traverse and wind a mandrel mounted therebelow. The mandrel is supported on a mandrel table, a vertically movable stabilizing plate, and horizontally movable opposed clamping members. Briefly, these memebrs are constructed and arranged to be operated by fluid pressure means such as hydraulic cylinders, the mandrel supporting members being constructed and arranged to provide a rotation of the mandrel for the sequential winding steps.

It is another salient object of the present invention to provide a new and improved apparatus of the type stated in which the opposed planar surfaces of a mandrel are wrapped by a feeding arm. In this embodiment of the apparatus, the mandrel is supported on a mandrel table and is engageable by a vertically movable stabilizing plate. The mandrel table is shiftable through a 90° arc and is cooperative with a second mandrel table which is shiftable to a vertical position when the first table is disposed in a horizontal position. Accordingly, each of these mandrel tables optionally serves as stabilizing plates and mandrel tables. Furthermore, the members are constructed and arranged to be operated by fluid pressure means.

It is an additional object of the present invention to provide an apparatus of the type stated and a method for wrapping the opposed planar surfaces of a mandrel by a feeding arm, which method and apparatus is completely automated, so that a mandrel can be completely wrapped without manual attention. This apparatus employs a program operated machine, which may be programmed and operated by plant personnel. The device employs phototransistors in an array-scanning capacity for limiting movements of the winding arm in various directions. A patch cord panel is also employed and which cooperates with the phototransistor for automatically controlling the movement of the mandrel and of the filament feeding arm.

A still further object of this invention is to provide a new and improved planar shipping container or the like comprised of transversely wrapped layers of continuous filament forming the shell, the filament being bonded by a resin which provides the necessary rigidity to the structure.

Still further objects of this invention contemplate the provision of a novel and notably superior and reliable method and apparatus for forming a container shell capable of withstanding unusually adverse conditions, which is inexpensive and of utterly reliable construction, and which is capable of withstanding severe stress and environmental conditions.

Still further according to this invention, the container may have built up local areas as where the longitudinal feed of the filament is slowed up with respect to the rotational speed of the filament feeding arm, and likewise, an open or "basket weave" construction may be provided depending on the regulation of the longitudinal feed with respect to the rotational feed of the filament.

These and numerous further objects, advantages, and novel features of the present invention will become apparent in the specification and claims taken in connection with the accompanying drawings.

FIGURES

In the drawings:

FIG. 1 is a diagrammatic perspective view illustrating a first embodiment of the method of the invention and showing the wrapping of four planar surfaces of a mandrel;

FIG. 2 is a diagrammatic perspective view illustrating a step of the first embodiment subsequent to that shown in FIG. 1 and showing the wrapping of the two additional surfaces of a mandrel;

FIG. 3 is a diagrammatic perspective view illustrating a step of the first embodiment subsequent to that shown in FIG. 2 and showing completion of a bidirectional wrap on each of the planar surfaces of a mandrel;

FIG. 4 is a diagrammatic perspective view illustrating a second embodiment of the method of the invention and showing the wrapping of four planar surfaces of a mandrel;

FIG. 5 is a diagrammatic perspective view illustrating a step of the second embodiment subsequent to that shown in FIG. 4 and showing the wrapping of the two additional surfaces of a mandrel;

FIG. 6 is a diagrammatic perspective view illustrating a step of the second embodiment subsequent to that shown in FIG. 5 and showing completion of a bidirectional wrap on each of the planar surfaces of a mandrel;

FIG. 7 is a diagrammatic perspective view illustrating a third embodiment of the method of the invention and showing the wrapping of four planar surfaces of a mandrel;

FIG. 8 is a diagrammatic perspective view illustrating a step of the third embodiment subsequent to that shown in FIG. 7 and showing the wrapping of the two additional surfaces of a mandrel;

FIG. 9 is a diagrammatic perspective view illustrating a step of the third embodiment subsequent to that shown in FIG. 8 and showing completion of a bidirectional wrap on each of the planar surfaces of a mandrel;

FIG. 10 is a diagrammatic perspective view illustrating a fourth embodiment of the method of the invention similar to that depicted in FIGS. 1–3 and showing the wrapping of four planar surfaces of a mandrel;

FIG. 11 is a diagrammatic perspective view illustrating a step of the fourth embodiment subsequent to that shown in FIG. 10 and showing the wrapping of the two additional surfaces of a mandrel;

FIG. 12 is a diagrammatic perspective view illustrating a step of the fourth embodiment subsequent to that shown in FIG. 11 and showing completion of a bidirectional wrap on each of the planar surfaces of a mandrel;

FIG. 15 is a fragmentary vertical sectional view of the filament driving apparatus, taken substantially along line 15—15 in FIG. 14;

FIG. 16 is a fragmentary horizontal sectional view taken substantially along line 16—16 in FIG. 15;

FIG. 17 is a view of the lower end of the filament feeding arm;

FIG. 18 is a fragmentary vertical sectional view taken substantially along line 18—18 of FIG. 17;

FIG. 19 is a fragmentary vertical sectional view, partially broken away and taken substantially along the line 19—19 of FIG. 17;

FIGS. 20 and 21 are partial front elevational views of the apparatus shown in FIG. 13, showing the wrapping of the mandrel during various steps thereof;

FIG. 23 is a top plan view of the filament winding apparatus of FIG. 22;

FIG. 24 is a fragmentary vertical sectional view taken along line 24—24 of FIG. 23;

Figure 22:
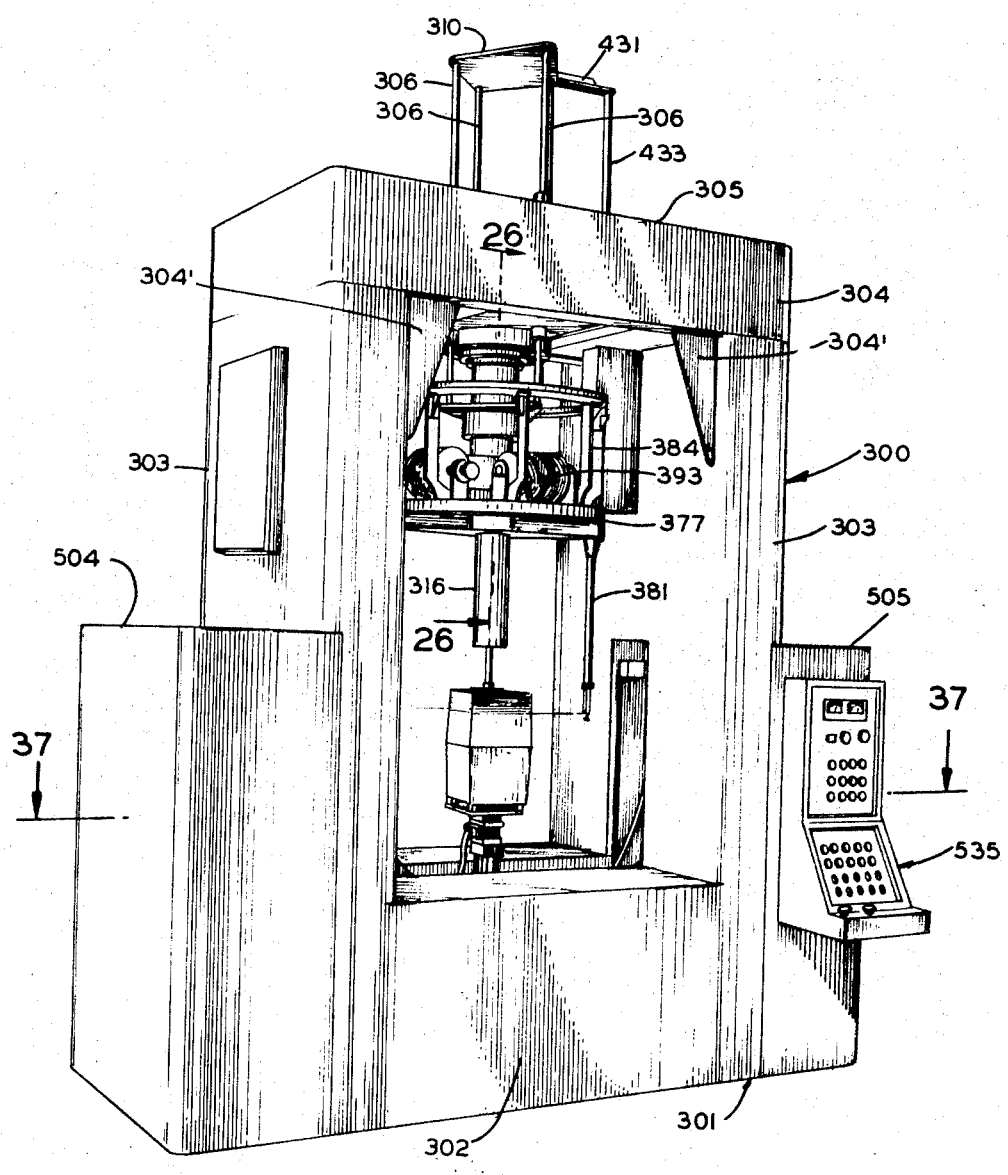
FIG. 22 is a perspective view of a modified form of filament winding apparatus constructed in accordance with and embodying the present invention.
Figure 26:
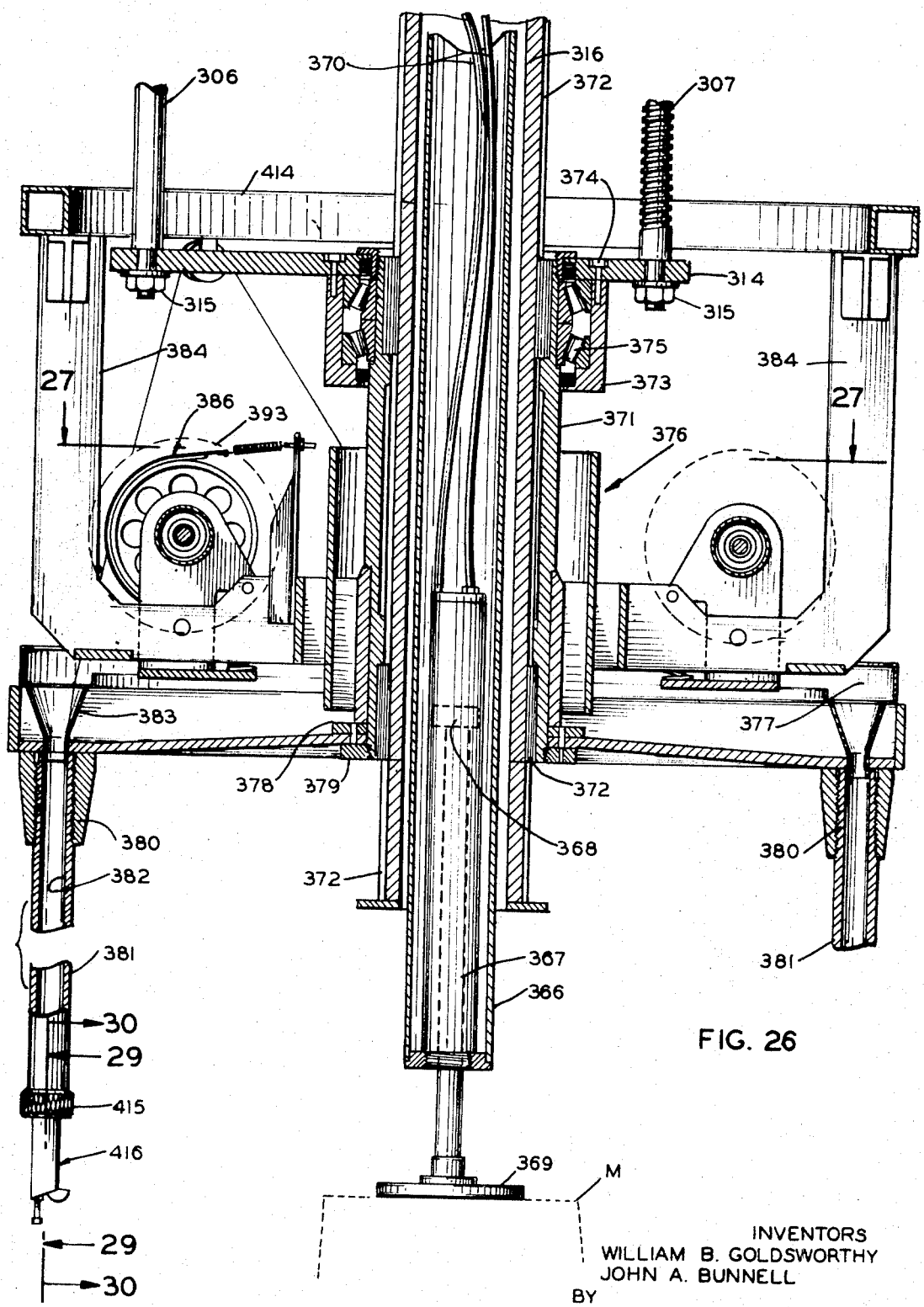
FIG. 26 is a vertical fragmentary sectional view taken along line 26—26 of FIG. 22.
Figure 43:
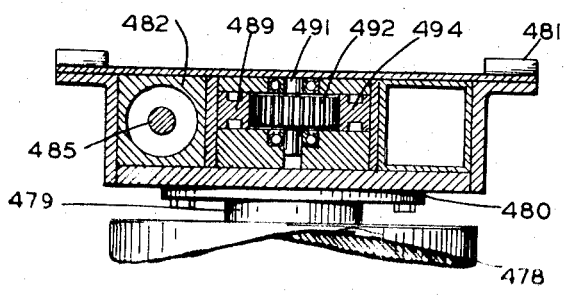
Figure 29:
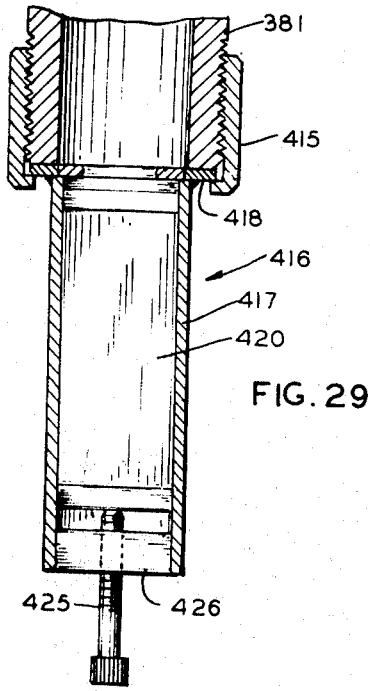
Figure 30:
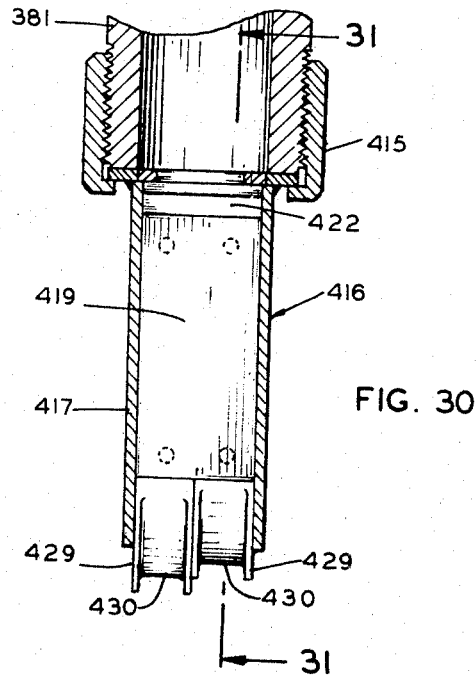
Figure 31:
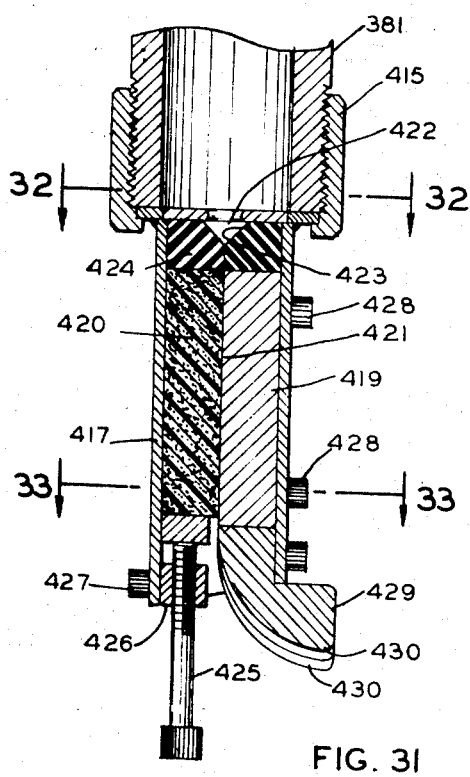
Figure 32:
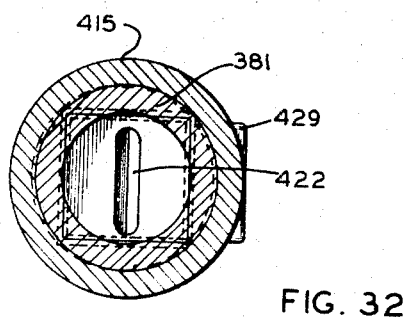
Figure 33:
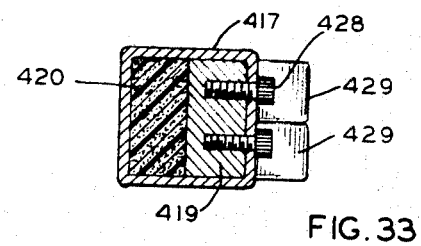
Figure 34:
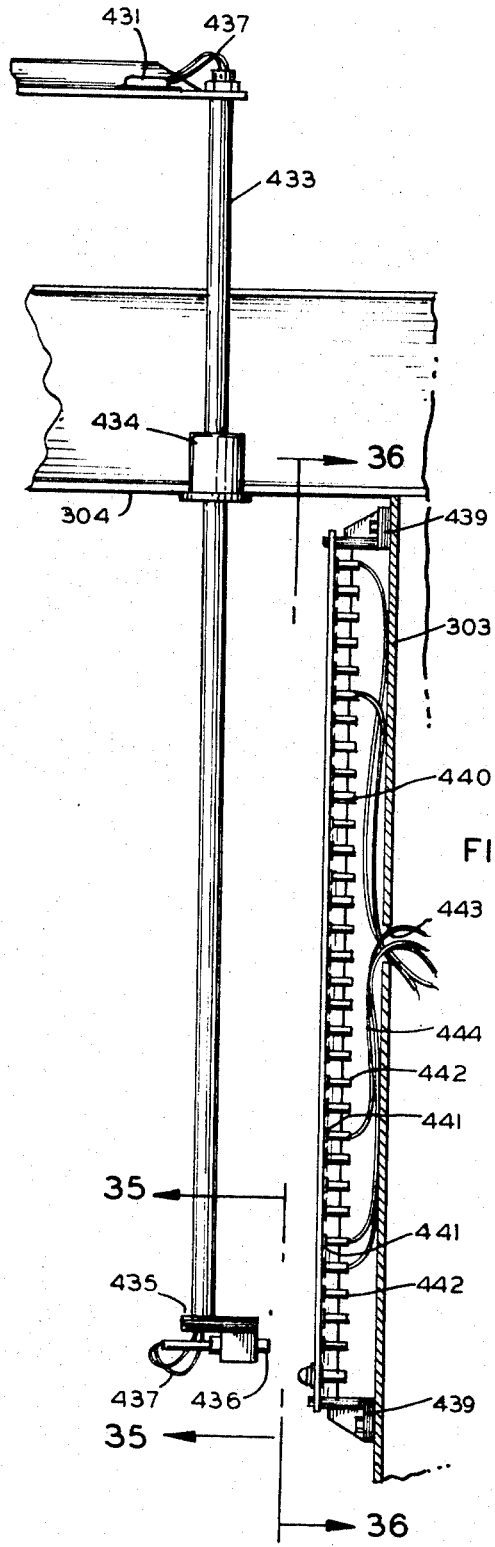
Figure 35:
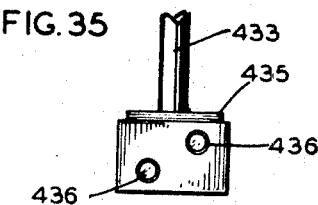
Figure 36:
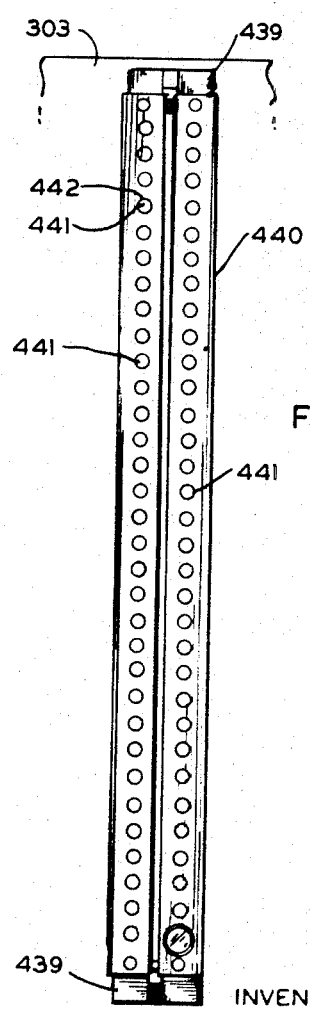
Figure 37:
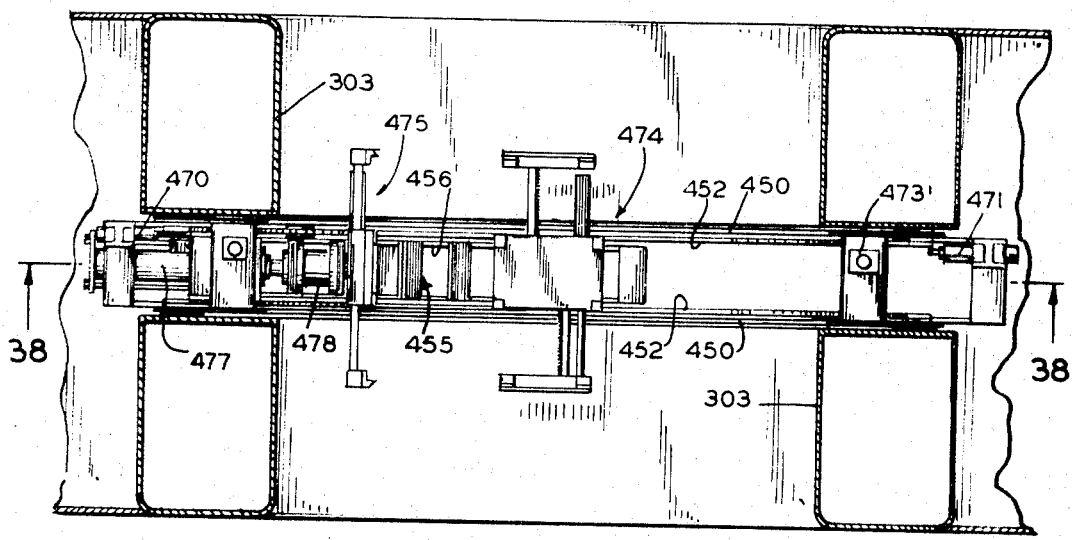
Figure 38:
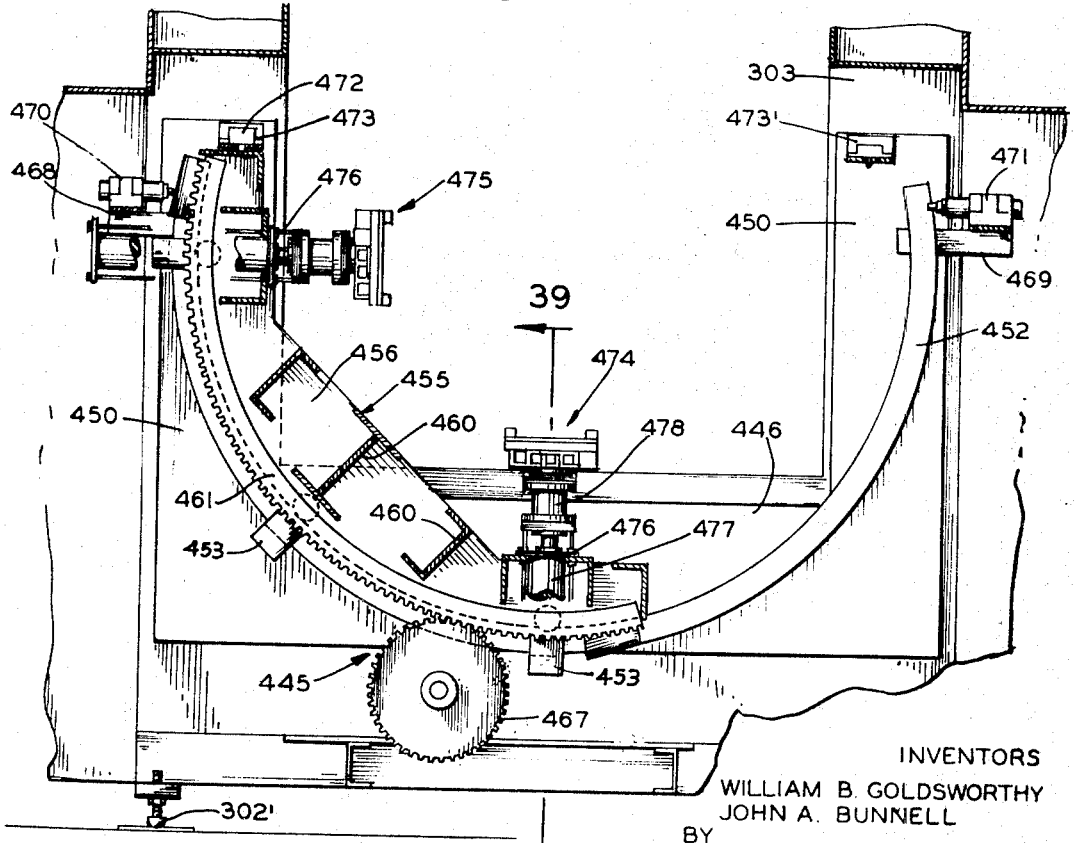
Figure 39:
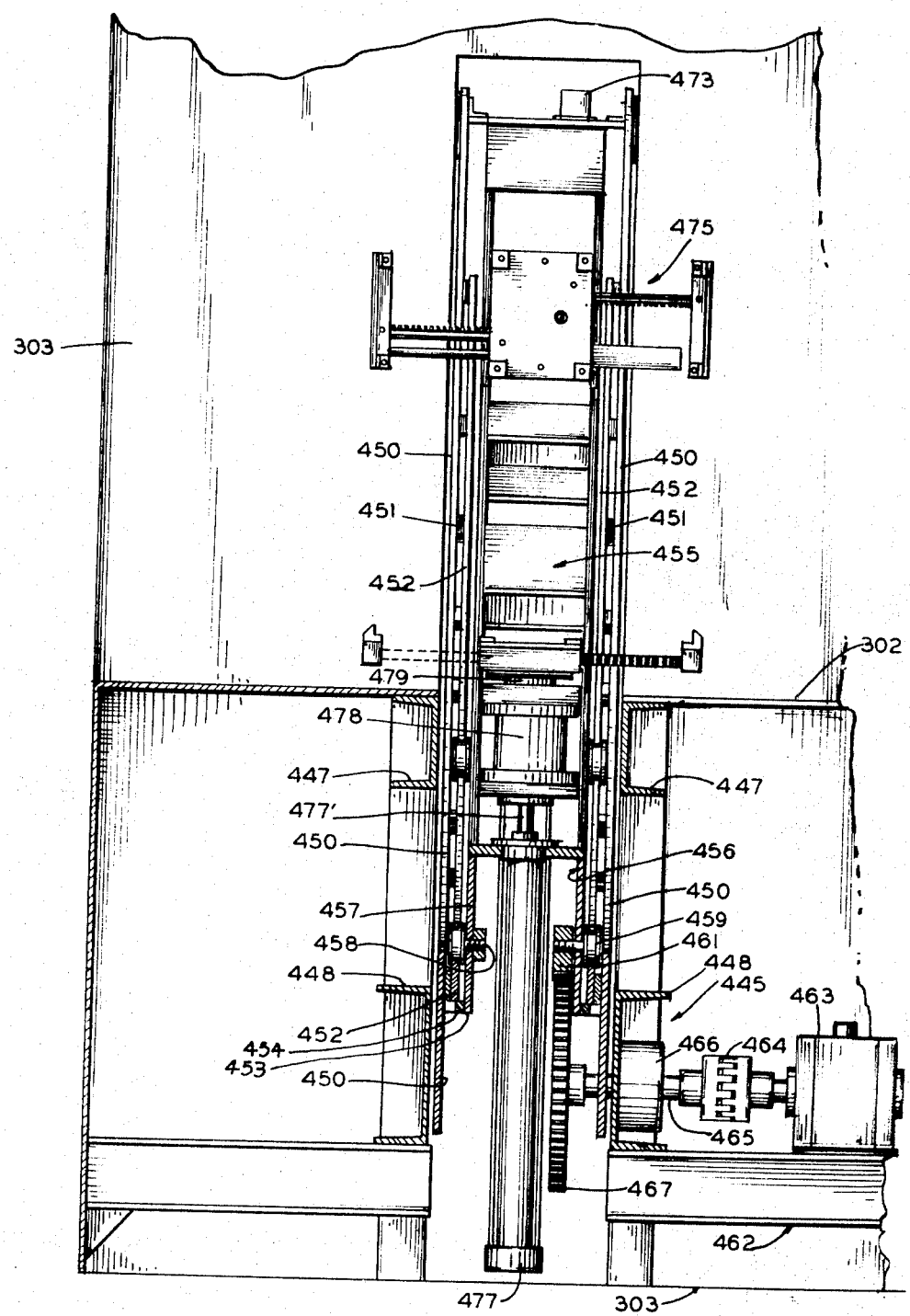
Figure 40:
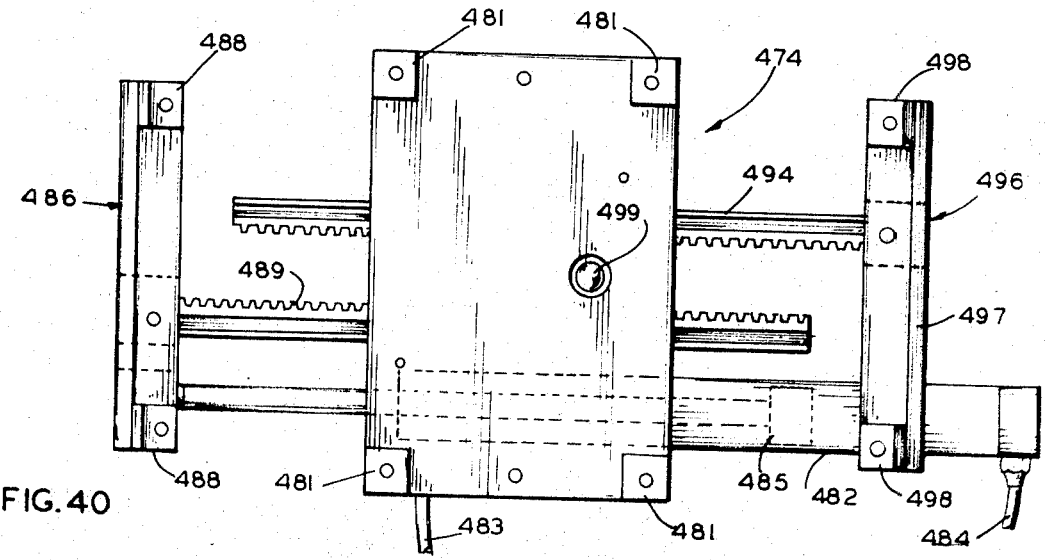
Figure 41:
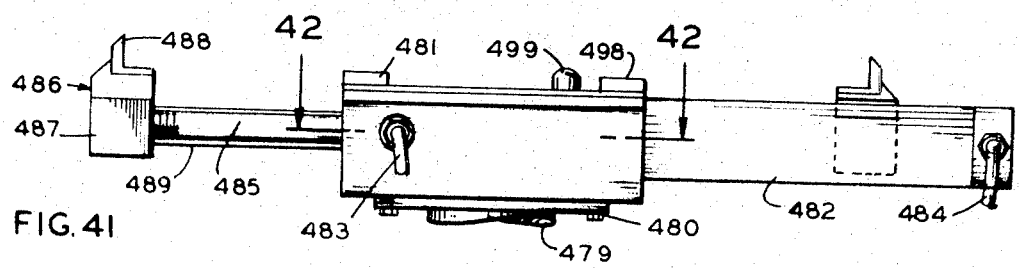
Figure 42:
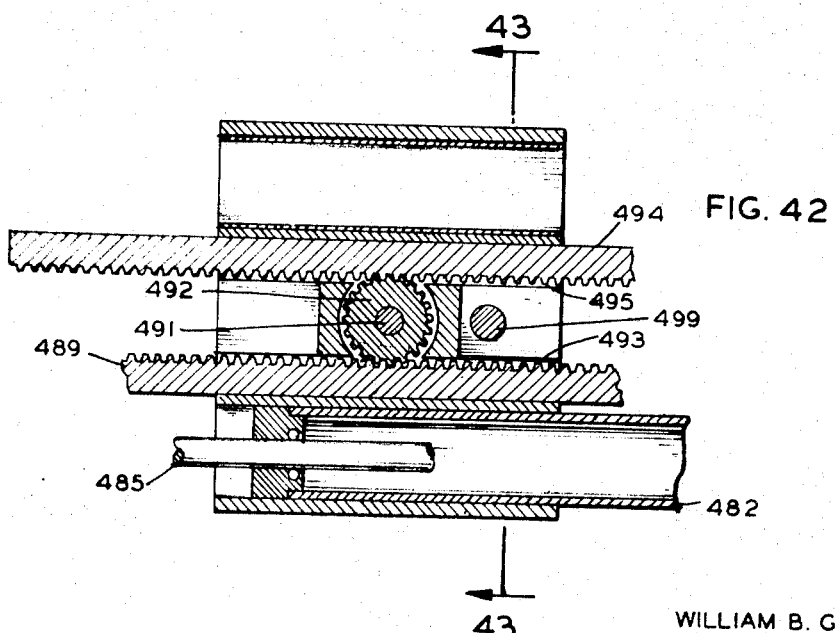
Figure 56:
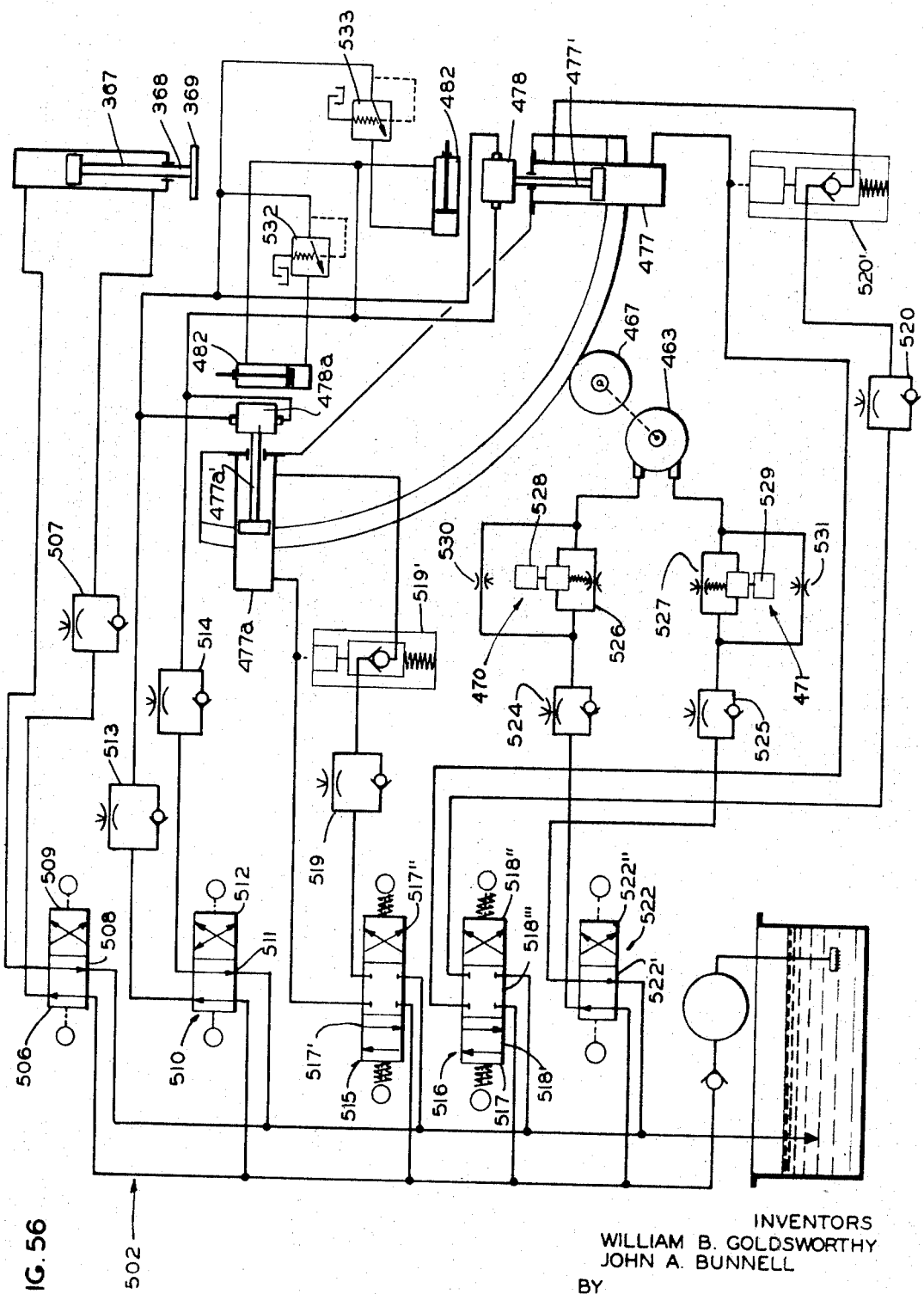
Figure 57:
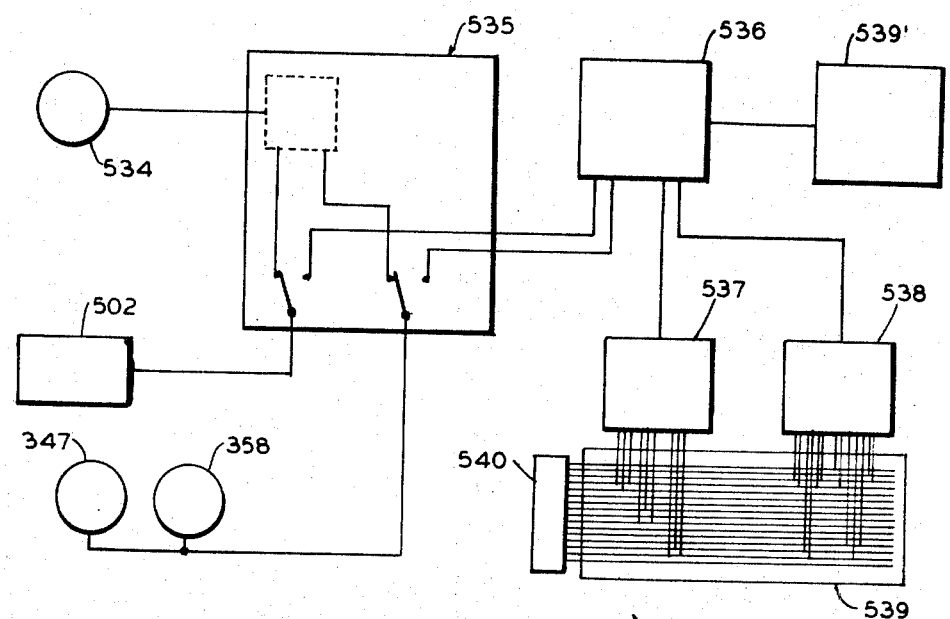
Figure 58:
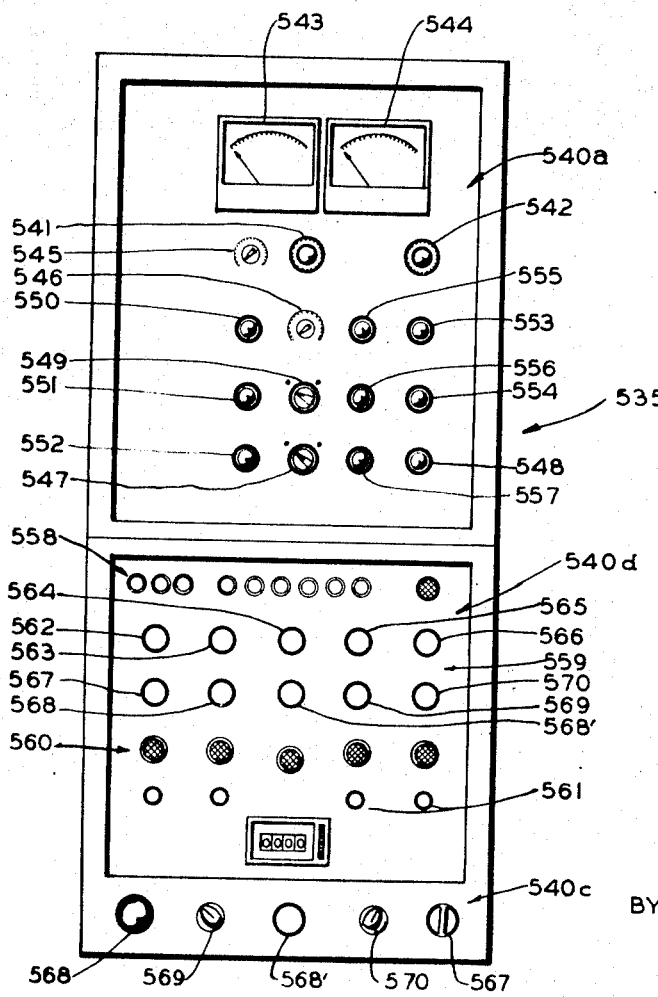
Figure 63:
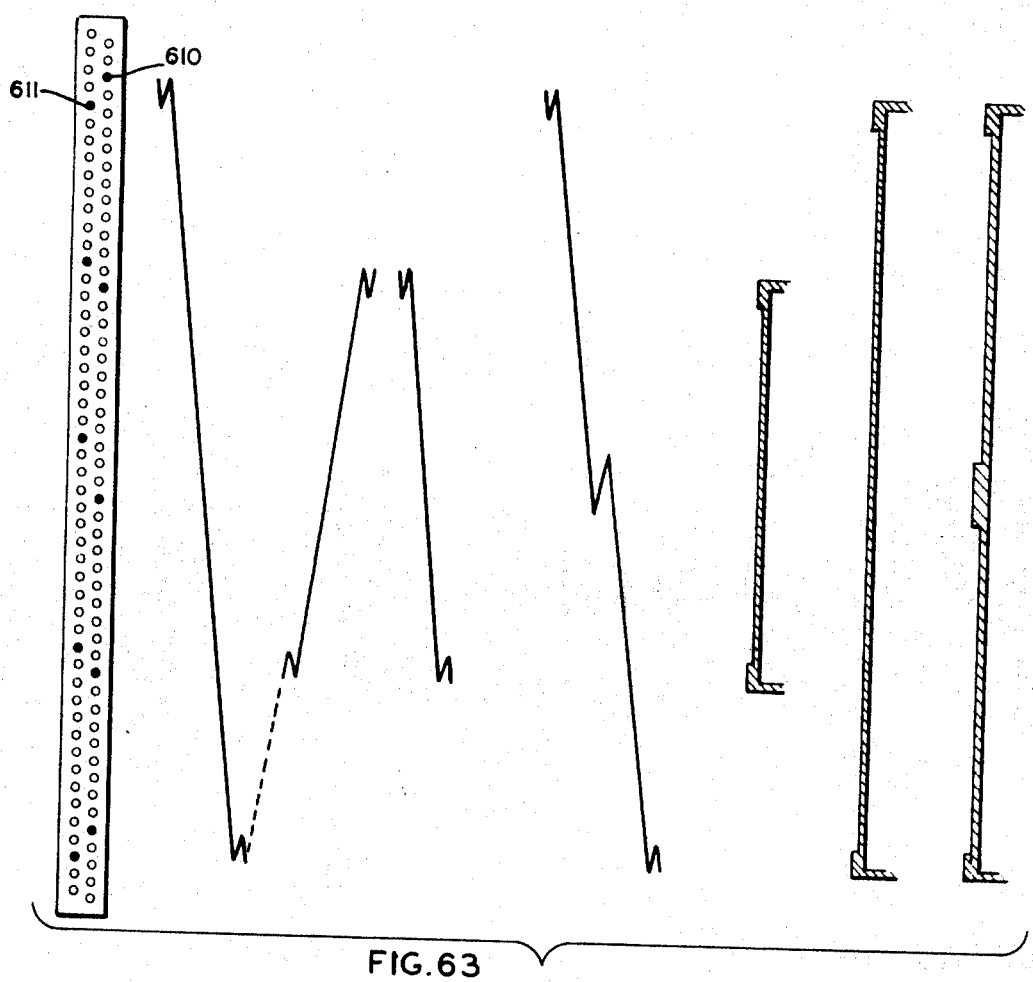
Figures 60, 61, 62:
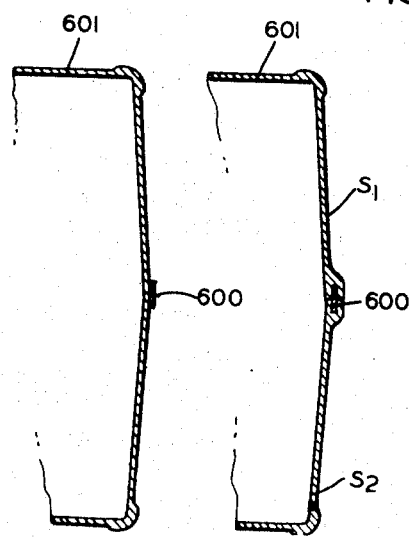
Figure 59:
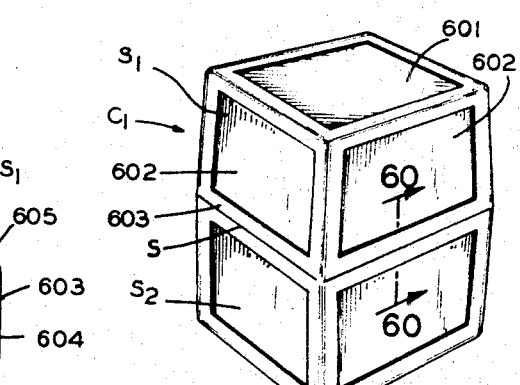
Figure 64:
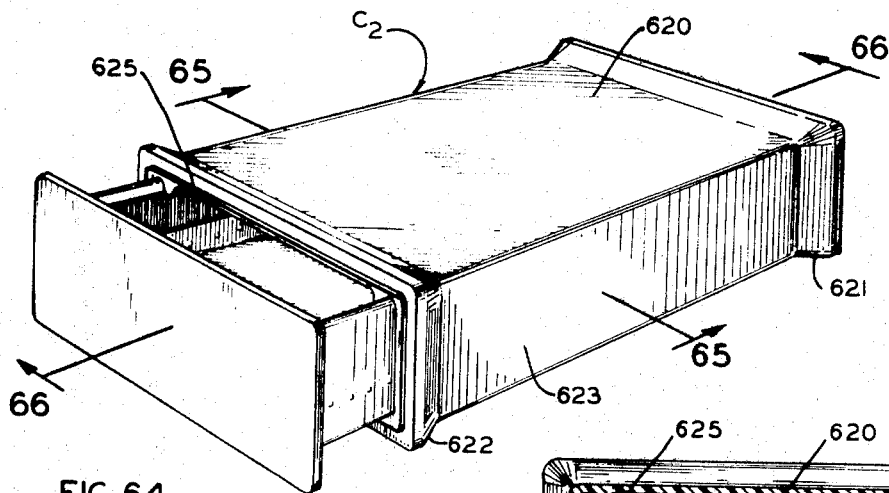
Figure 65:
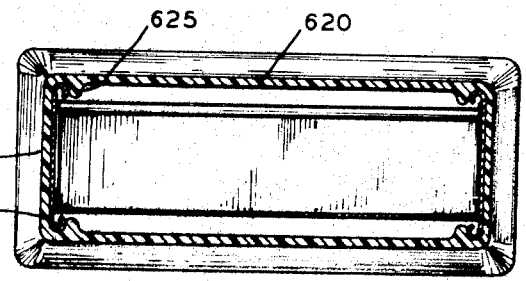
Figure 66:
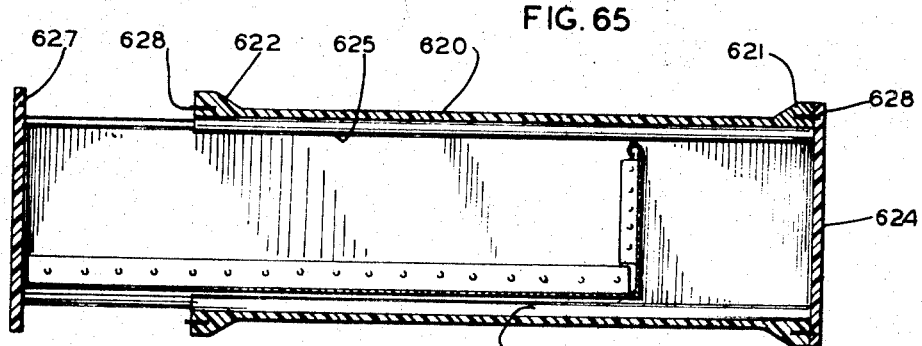
Figure 68:
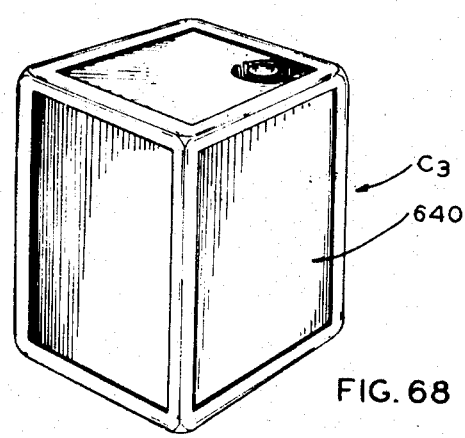
Figure 67:
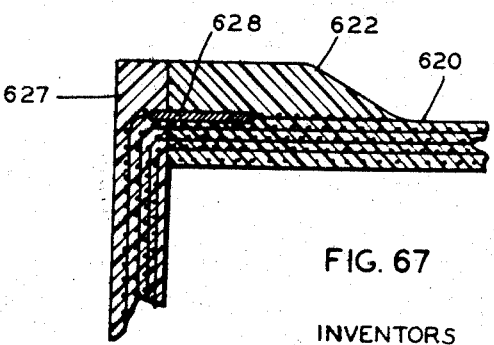
Figure 69:
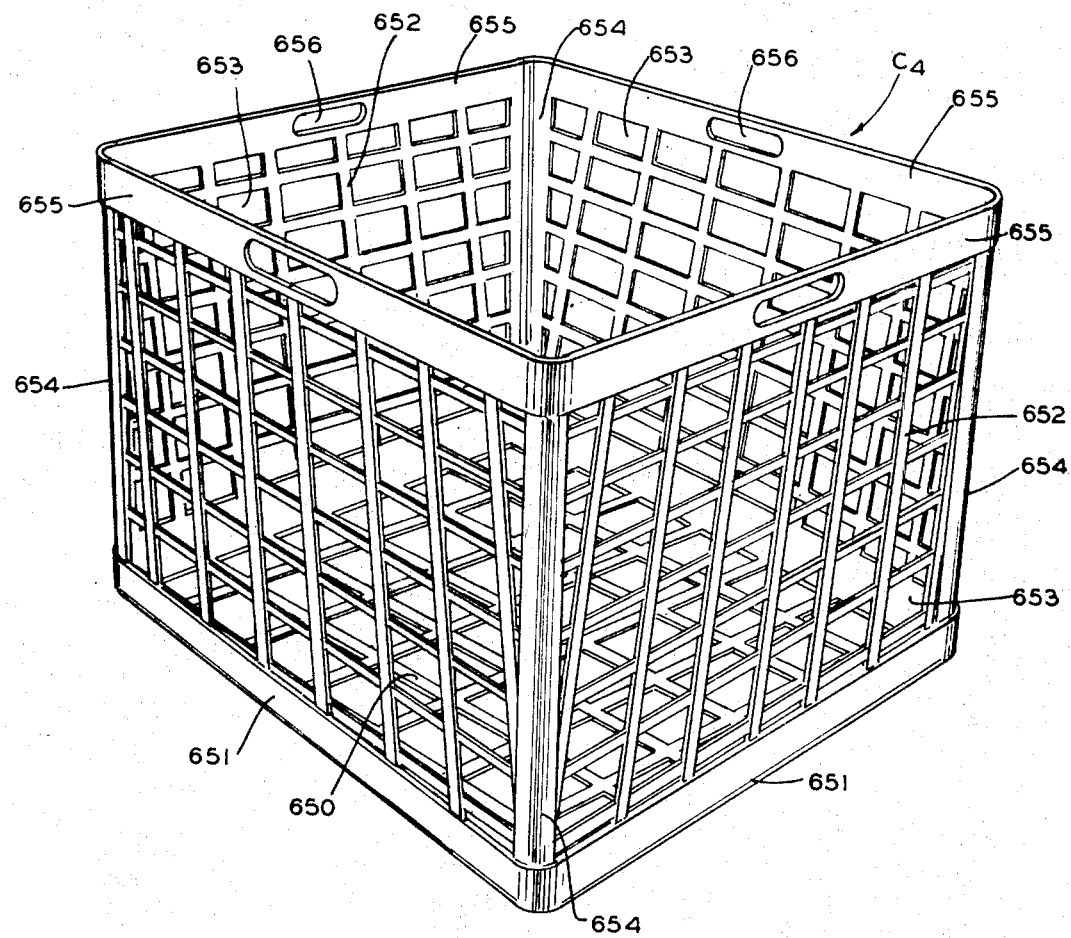

FIGS. 29 and 30 are fragmentary vertical sectional views taken along lines 29—29 and 30—30 respectively of FIG. 26 and showing a portion of the feeding head forming part of the present invention;

FIG. 31 is a fragmentary sectional view taken along line 31—31 of FIG. 30;

FIGS. 32 and 33 are fragmentary sectional views taken along lines 32—32 and 33—33, respectively of FIG. 31;

FIG. 34 is a side elevational view of the photodiode control system forming part of the apparatus of FIG. 22;

FIGS. 35 and 36 are vertical fragmentary sectional views taken along lines 35—35 and 36—36 respectively of FIG. 34;

FIG. 37 is a horizontal sectional view taken along line 37—37 of FIG. 2;

FIG. 38 is a vertical fragmentary sectional view taken along line 38—38 of FIG. 37;

FIG. 39 is a vertical fragmentary sectional view taken along line 39—39 of FIG. 38;

FIG. 40 is a top plan view of the table and clamping mechanism forming part of the apparatus of FIG. 22;

FIG. 41 is a side elevational view partially broken away and in section of the table and clamping mechanism of FIG. 40;

FIG. 42 is a fragmentary sectional view taken along line 42—42 of FIG. 41;

FIG. 43 is a fragmentary sectional view taken along line 43—43 of FIG. 42;

FIGS. 44-55 relates to the method of filament winding about three axes of a mandrel employing the apparatus of FIG. 22 et seq. of which:

FIG. 44 is a schematic side elevational view showing the mandrel in the beginning of the first positioning cycle;

FIG. 45 is a schematic side elevational view showing the mandrel shifted 90°;

FIG. 46 is a schematic side elevational view showing the mandrel rotated 90° in addition to the first wrapping position;

FIG. 47 is a perspective view of the mandrel showing filament wrapped about the first axis of rotation on four planar sides;

FIG. 48 is a schematic side elevational view showing the mandrel being shifted to the second wrapping position;

FIG. 49 is a schematic side elevational view showing the mandrel shifted 90°;

FIG. 50 is a schematic side elevational view showing the mandrel then rotated 90° to the second wrapping position;

FIG. 51 is a perspective view showing the mandrel wrapped about two axes of rotation showing four planar sides having a unidirectional wrap and two planar sides having a bidirectional wrap;

FIG. 52 is a schematic side elevational view showing the mandrel being shifted to the third wrap position;

FIG. 53 is a schematic side elevational view showing the mandrel shifted 90°;

FIG. 54 is a schematic side elevational view showing the mandrel rotated 90° to the third wrapping position;

FIG. 55 is a perspective view of the mandrel showing all six surfaces having a bidirectional wrap;

FIG. 56 is a schematic view of the hydraulic circuitry forming part of the present invention;

FIG. 57 is a schematic view of the electrical control circuitry forming part of the apparatus of the present invention;

FIG. 58 is a front plan view of a control console forming part of the apparatus of the present invention;

FIG. 59 is a perspective view of a rectangularly shaped container which is formed by the apparatus and method of the present invention;

FIG. 60 is a vertical fragmentary sectional view taken along line 60—60 of FIG. 59;

FIGS. 61 and 62 are schematic sectional views showing the method of making the container of FIG. 59;

FIG. 62 is a schematic view showing the arrangement of plug-in phototransistors necessary to make the container of FIG. 58 on a programmed basis;

FIG. 63 is a schematic view showing the arrangement of plug-in phototransistors to obtain a wrapping program for achieving the filament wrap of a container;

FIG. 64 is a perspective view of a modified form of filament apparatus constructed in accordance with and embodying the present invention;

FIGS. 65 and 66 are vertical sectional views taken along lines 65—65 and 66—66 respectively of FIG. 64;

FIG. 67 is an enlarged fragmentary sectional view showing the filament winding lays of the container of FIG. 64;

FIG. 68 is a perspective view of a modified form of container constructed in accordance with and embodying the present invention; and FIG. 69 is a perspective view of another modified form of container constructed in accordance with and embodying the present invention.

GENERAL DESCRIPTION

Generally speaking, the present invention provides both a method and apparatus for filament winding about a mandrel having opposed planar surfaces and which are substantially rectangularly shaped. The present invention also provides novel products which are produced by the apparatus and the method. The present invention provides five embodiments of the method of wrapping the opposed planar surfaces of a mandrel to provide a bidirectional wrap about all of the opposed planar surfaces. The present invention also provides a process where the resin may be impregnated into the filament before the winding step and also may be impregnated into the filament after the winding step. When the resin is impregnated into the filament prior to winding, the filaments are generally passed in a dip tank and then squeezed to control the resin content. The wrapped mandrel may also be impregnated by such operations as dipping, spraying and the like.

In the first embodiment of the method described herein, the feeding arm which pays out the filament is reciprocated about its longitudinal axis with respect to the mandrel but is non-rotative with respect to this axis. The mandrel is sequentially rotated in three directions so that a bidirectional wrap is accomplished on all six planar surfaces of the mandrel. In the second embodiment of the method, the mandrel is fixed while the feeding arm is reciprocating and rotating and is swung into three axes of rotation which are required to apply a bidirectional wrap to each of the six planar surfaces.

In the third embodiment of the method described herein, the mandrel is fixed in position and three feeding arms are provided. Each of the feeding arms rotates about the mandrel and reciprocate about an axis 90° with respect to each other. In the fourth embodiment of the method described herein, the feeding arm is reciprocal but non-rotatable. The mandrel is swung and rotated to position the same in the appropriate plane for the consecutive winding steps. During the actual feeding operation, the mandrel is rotated with respect to the feeding arm.

In the preferred embodiment, namely the fifth embodiment of the invention described herein, the feeding arm rotates about the mandrel and reciprocates simultaneously until the filament covers the entire planar surfaces along the axis of reciprocation. The mandrel is shifted so that the winding occurs on the sixth planar surface in three distinct operations, thereby acquiring a bidirectional wrap on each of these six opposed planar surfaces.

The present invention provides two embodiments of an apparatus for accomplishing the methods previously described. The first apparatus of the present invention includes a supporting frame which, in turn, provides a mandrel table for supporting the mandrel during the winding operations. The table is fluid actuated so that the mandrel may be shifted vertically with respect to a winding arm. The winding arm is also reciprocated vertically during the winding operation and generally is aligned with the upper margin of the mandrel at the start of the winding operation. The feeding arm rotates and shifts about the mandrel, thereby wrapping the filament around four of the planar surfaces thereof. Simultaneosuly therewith, the feeding arm is slowly shifted downwardly until the feeding head of the feeding arm passes the full vertical direction of the vertical planar surfaces of the mandrel.

Thereafter, the mandrel is rotated 90° with respect to its original position, at which time the feeding operation is again commenced. The rotation of the mandrel is assisted by a pair of mandrel guide clamps which are located in a plane which is perpendicular to the mandrel table.

Also disposed above the mandrel in approximate vertical alignment with the mandrel table is an upper mandrel stabilizing plate which is adapted to engage the mandrel for stability during the winding operation. Both of the mandrel guide clamps and the upper stabilizing plate are shiftable into and out of engagement with the mandrel and cooperate in a manner so that the mandrel is capable of being shifted through the various planes for accomplishment of the winding.

The present invention also provides a preferred embodiment of the apparatus which is somewhat similar to the previously described apparatus. The preferred embodiment of the apparatus employs a supporting frame with a pair of opposed downwardly extending filament feeding arms. Furthermore, this embodiment of the apparatus provides a mandrel table for supporting the mandrel and positioning the same with respect to the rotating feeding arms. As the feeding arms rotate in this apparatus, they also shift downwardly for the full length of the vertical planar surfaces of the mandrel. After they have reached the lowermost position, they may be shifted upwardly to start a new wrapping cycle or continue to shift upwardly simultaneously winding filament about the mandrel in the same cycle. This embodiment of the apparatus does not employ a pair of opposed mandrel guides, which are located in a plane 90° with respect to the mandrel table. Actually, this embodiment of the apparatus employs a pair of mandrel tables which are located in planes at 90° with respect to each other. Furthermore, each of the mandrel tables is mounted on an arcuately shiftable frame for shifting either one of the tables to the mandrel supporting position. When one table is shifted to the vertical mandrel supporting position, the other of the mandrel tables shifts to a horizontally disposed and retracted position, in which manner the two tables alternately become the prime mandrel support. During the shifting of the mandrel through the various planes for wrapping thereof, both mandrel tables cooperate and momentarily engage the mandrel simultaneously.

The present embodiment of the invention also provides means for programming the apparatus to operate automatically. The apparatus employs a series of phototransistors arranged in a vertical plug-in array, which monitor the winding operation. The array is scanned by a pair of light sources moving in direct relationship with the feeding arms. The operator of the apparatus then programs the apparatus for wrapping a desired configuration by plugging the necessary phototransistors into the array at the specified dimensions. A patch cord panel is also provided for programming the operation of the machine in accordance with the program provided by the inserted phototransistor.

The embodiment of the apparatus can also be operated manually as well and is provided with a complex control panel for attaining the degree of automatic or manual operation as desired.

The present invention also provides a series of unique containers which are produced by the apparatus and the method described herein. The first of these containers is a completely filament wound container having unique receptable and cover member locking means. The second of the containers described herein includes metal filaments in the body and suitably serves as an electronic component housing. The third of the containers described herein is a molded body which is reinforced by the filament winding process and apparatus described herein.

METHOD

According to the method of this invention, a mandrel is sequentially wrapped about the opposed planar surfaces thereof to provide a bidirectional wrap about all the opposed planar surfaces. The filament is fed under tension about the mandrel, the degree of tension imparted to the filament during the wrapping step depending, of course, on the type of roving and the number of roving ends used. In a wet winding system, the preferred tension is about 10 pounds per strand of 60 end rovings. When preimpregnated roving is used, the tension may range up to one pound for each individual end.

The filament utilized to form the container according to this invention may be inorganic material, organic, organic synthetic or metallic metal or yarn; Fiberglas roving, for example, affording very satisfactory results. Typical examples are filaments of glass, steel, cellulose acetate, regenerated cellulose, cellulose acetate-propionate, nylon (e.g. polymeric hexamethylene adipamide), linear polyester, e.g. polyethylene terephthalate, acrylonitrile fibers, vinyl chloride-vinyl acetate copolymer, acrylonitrile-vinyl chloride copolymer, polyurethane fibers.

The resins for ultimately bonding the wrapped filaments are of the thermosetting type, such as thermosetting polyesters, epoxies, phenolics, urethanes, and the like. Illustrative of such materials are bisphenol A-epichlorhydrin resins, phenol-formaldehyde, cresol-formaldehyde, phenol-furfural, diallyl phthalate, modified ethylene glycol-adipate, triallyl cyanurate, diethylene glycol bisallyl carbonate resins, polyurethanes, e.g. from toluene diisocyanate and LG56 (a trial adduct of glycerine and propylene oxide having a molecular weight of about 1000) or crosslinked polypropylene glycol-toluene diisocyanate polyurethane, furfuryl alcohol resins. Any of the thermosetting resins referred to in Ward Pat. 2,835,107 on column 3, line 45 to column 5, line 6 can be used and this portion of the Ward patent is hereby incorporated by reference.

In a specific example there was used a thermosetting phenol-formaldehyde resin with glass fibers, alternatively a thermosetting polyester e.g. styrene modified ethylene glycol adipate-mallate can be used with the glass fiber.

The resin, as stated, may be impregnated into the filament before or after the winding step, as particular conditions warrant. When the resin is impregnated into the filament prior to the winding step, the filaments may be passed through a dip tank, and a squeeze bushing to control the resin content.

When it is preferable to wind the filament about the mandrel in a dry state, the wrapped mandrel may be impregnated subsequent to the winding step by dipping, spraying, vacuum impregnation, and the like. Under such circumstances, when the filament is wound in a dry state onto the mandrel, means are provided to insure the filament does not slip off the corners or ends of the mandrel as by providing omni-directional pegs extending from the intersecting planar surfaces of the mandrel.

After the mandrel has been wrapped by the filament according to this invention and impregnated, the bonding resin is subsequently cured to provide a rigid container structure having notably superior structural qualities.

One method of curing the wrapped filament which has been impregnated prior to the wrapping step is to remove the mandrel from the winding apparatus with the wet layer in place and apply external pressure to this layer by vacuum bagging, tape lagging, or the like, and curing the structure in an oven or other suitable heating means. After curing, the formed container in split from the mandrel as by sawing around a desired parting line and the container is then ready for final assembly and shipping purposes. If the formed shell is to be lagged with tape to provide the external pressure thereto, it is preferably spirally wrapped with a shrinking plastic tape e.g. biaxially oriented irradiated polyethylene or biaxially oriented polyvinylidene chloride (Saran) see Rainer Pat. 2,877,500 and Stephenson Pat. 2,452,080. In this regard, the curing temperatures which would be subsequently applied cause the tape to shrink, thereby providing the external pressure thereto.

In vacuum bagging, the wrapped mandrel would be placed in a bag made from nylon or polyvinyl alcohol film. The bag is then sealed and the air evacuated therefrom, thus providing a pressure of approximately 14 p.s.i. over the entire surface of the wrapped mandrel and this pressure is maintained during the curing operation.

Another approach to the curing step is provided by removing the mandrel from the winding apparatus and placing it in a split female mold while heat and pressure are applied either by press closure or expanding an elastomeric bag that forms a skin between the mandrel and the wrapped filaments. Removal and finishing of the container are completed as previously described.

Still another method of curing the bonding resin is by removing the wound mandrel after the winding step, and splitting the uncured layer along predetermined parting lines, thence passing the two predetermined shells thereby obtained in matched metal or rubber plunger molds and subsequently curing the resin.

Still another method of applying the resin to the filament is by use of preimpregnated rovings, wherein the roving which has been impregnated with the desired resin in a coating machine is precured to a point which provides more or less a dry filament containing the proper resin content.

Curing pressures and temperatures vary over a considerable range, depending, of course, on the resin used. Temperatures are normally in the range between 210° F. and 350° F. and pressures may vary between 10 p.s.i. in the case of the lagging system and several hundred p.s.i. in the case of machined metal dies.

Turning now to FIGS. 1–12, representative methods for winding the mandrel with the filament are shown. In FIGS. 1–12, there is shown a rectangular mandrel 20, the opposed planar surfaces thereof conforming to the desired interior configuration of the container to be formed. When the filament is wrapped in a dry state, the mandrel 20 has omnidirectional pegs 21 extending from the intersection planar surface thereof, preferably being 135° from either surface to insure the filament does not slide off the ends of the mandrel 20. A filament feeding arm 22 having an axial portion 24 about which the rotation may be provided, and a free end 26 axially offset from the extension 24 by a transverse extension 28. The feed arm 22 may be a tubular member bent into the desired shape.

Referring now to FIGS. 1–3, the feeding arm 22 is reciprocated about its longitudinal axis but fixed with respect to this axis, the mandrel 20 being rotated during the consecutive winding steps. The mandrel 20 is rotating in a counterclockwise direction while the feeding arm 22 is moving longitudinally from one end of the mandrel 20 to the opposite end while feeding the filament 30 under tension about the opposed sides, and the top and bottom surfaces of the mandrel 20. After the feeding arm 22 has wrapped these opposed planar surfaces, the mandrel 20 is repositioned in a plane perpendicular to the position in FIG. 1, thereby assuming the position shown in FIG. 2. The arm 22 is again reciprocated feeding the filament 30 about the opposed sides and end surface of the rotating mandrel 20 while transversing the opposed planar surfaces thereof, the filaments being generally perpendicular to the lay of the filaments in the step shown in FIG. 1. After the mandrel has been wound as shown in FIG. 2, the mandrel is again repositioned in a plane 90° with respetc to the position shown in FIGS. 1 and 2, the feeding arm 22 again reciprocating and wrapping the top and bottom and opposed ends of the rotating mandrel 20, thereby providing a lay of filament 30, 90° with respect to the lay of the filament 30 in FIGS. 1 and 2. Thus, by this sequence of steps, the mandrel is completely enclosed by the tensioned filament 30, these steps being repeated as often as desired to form the desired wall thickness and strength properties of the container. Alternatively, the winding step in FIG. 3 may be carried out to a prospective slit line S and the mandrel 20 rotated 180° to complete this winding step.

FIGS. 4–6 depict alternative steps for winding the filament about the mandrel 20 wherein the mandrel 20 is fixed while the reciprocating and rotating arm 22 may be swung into different axes of rotation as necessary to wrap the mandrel 20. In FIG. 4, the mandrel 20 is shown supported by the extending pegs 21 positioned at 135° from either surface adjacent a plane passing through the center of the mandrel 20. In this step, the arm 22 wraps the top, bottom, and opposed end walls of the mandrel 20; in FIG. 5, the arm 22 feeds the filament 30 from an axis lying in a common horizontal plane to the axis in FIG. 4, but angularly displaced through 90°, thereby wrapping the top, bottom, and opposed side walls of the mandrel 20; and, in FIG. 6 the arm 22 is again repositioned for rotating about an axis in a plane 90° to the axes of rotation in FIGS. 4 and 5, the arm winding the filament 30 to the split line. In FIG. 6, the remainder of the winding step is completed by rotating the mandrel 180° or alternatively adding another winding arm (not shown) to complete the winding step.

In FIGS. 7–9, the mandrel 20 is fixed and three feeding arms are provided, each of the feeding arms rotating and reciprocating about an axis 90° one to the other. The feeding arm 22 in FIG. 7 wraps the top, bottom, and opposed end walls of the mandrel 20; the arm 22' in FIG. 8 wraps top, bottom, and opposed side walls of the mandrel 20; and the arm 22" in FIG. 9 wraps the opposed end and side walls of the mandrel 20.

Turning now to FIGS. 10–12, the winding arm 22 is nonrotating but is reciprocable along its axis and the mandrel 20 is swung and rotated to position the same in its appropriate plane for the consecutive winding steps. Thus, in FIG. 10 the mandrel 20 is held and rotated by opposed rotating drive plates 32, 32' which are shown to rotate the mandrel 20 in a counterclockwise position. Suitable positioning clamps 34, 34' are provided to properly space the mandrel 20 for rotation about its axis and to otherwise obviate an eccentric rotation thereof, as is apparent. Likewise, in FIGS. 11 and 12, the opposed end and side walls, and the top, bottom, and end walls, respectively are sequentially wrapped by rotation of the mandrel 20 while the arm 22 is reciprocable only about its axis.

The fifth embodiment of the method of winding of the present invention is more fully illustrated in the modified form of winding apparatus illustrated and described herein, and shows the preferred method of filament winding in the present invention. In the fifth embodiment of the method, the mandrel 20 is placed in a stationary position on one planar surface in the manner as illustrated. The feeding arm 22 is rotated and simultaneously reciprocated. The arm 22 is reciprocated and rotated in the same manner as in the embodiment described in FIGS. 4–6, with the exception that the arm 22 is not swung into different axes of rotation. After the mandrel has been wrapped along four planar surfaces, the mandrel is turned 90° in one plane to an upright position and rotated 90° in a second plane where winding again commences and the filament is wound on the two additional planar surfaces of the mandrel. It is also to be noted that this additional winding movement creates a bidirectional wrap on two of the previously wrapped planar surfaces. After the second step of the winding operation has been performed, the mandrel is rotated an additional 90° in one plane and rotated 90° again in another plane where winding is again repeated.

WINDING APPARATUS

Figure 13:
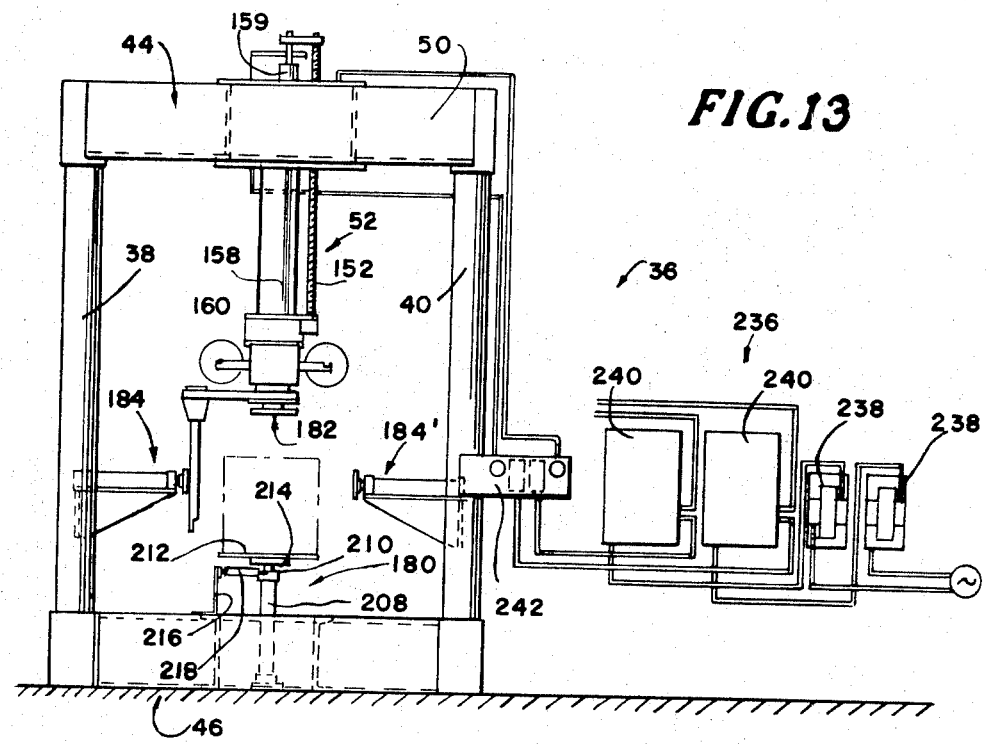
FIG. 13 is a front elevational view for carrying out the winding step of the present invention.
Figure 14:
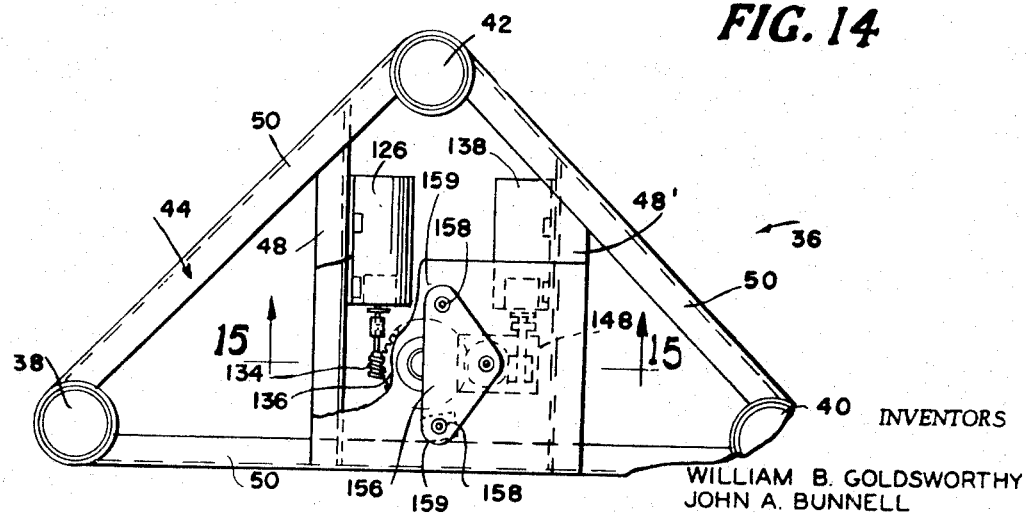
FIG. 14 is a top plan view of the apparatus in FIG. 13.

Turning now to FIG. 13, there is shown an apparatus 36 for winding the mandrel 20 according to still another feature of the present invention. The apparatus 36 includes upright stanchions 38, 40, 42 disposed in generally parallel and triangular relationship, as best shown in FIG. 14. Carried by the upper end of the stanchions 38, 40, 42 is an upper frame portion 44, the lower ends thereof joined by a lower frame portion 46. The upper frame portion 44 includes spaced apart parallel channels 48, 48' joined at their ends to beams 50 which in turn are secured at their ends to the respective stanchions, as best shown in FIG. 14. The lower frame portion is of similar construction.

Referring now to FIGS. 13–15 there is shown the apparatus according to this invention which carries a filament arm driving mechanism or apparatus 52 for winding the filament 30 about the mandrel 20, while traveling in a reciprocatory path, FIG. 13 also showing means to support the mandrel 20 during the winding thereof.

The apparatus 52 includes a central sleeve 54 having a flange 56 at its upper end. The sleeve 54 is supported in a vertical position between the channels 48, 48' by an upper tapered bearing surface 58 engaged by upper thrust bearings 60, which, in turn, are operatively carried within an upper bearing housing 62. The upper bearing housing 62 is supported by upper plate 64 which is carried by the upper ends of the channels 48, 48'. A cooperating lower supporting plate 66 is joined to the lower ends of the channels 48, 48', as best shown in FIG. 15. The central sleeve 54 is likewise supported adjacent the lower plate 66 by an intermediate bearing surface 68 which engages intermediate thrust bearings 70, which, in turn, are operatively carried in an intermediate bearing housing 72.

The lower end of the circular sleeve 54 is longitudinally splined along its length as at 74, the splined portion 74 of the sleeve 54 slidably receiving an outer sleeve 76. Joined to the outer sleeve 76 is a horizontal frame 78 adapted to support four filament spools 80. The frame 78 includes four pairs of opposed extending brackets 82, 82' having vertical slots 84, 84' respectively joined to the upper ends thereof. Carried in the slots 84, 84' are spool supporting rods 86, the rods 86 carrying the filament spools 80 as shown in FIGS. 13, 15 and 16. Compression springs 88, 88' are mounted on the rods 86 between the ends of the spools 80 and the respective spool brackets 82, as best shown in FIG. 16, to provide a braking effect for the spools 80 as they are rotated during operation of the apparatus 52. Also, there are conveniently provided spring loaded pins 90, 90' which are normally biased outwardly and carried by the spool brackets 82, 82' and the frame 78 for engagement with the reel frames of the spools 80 to further provide the desired tension on the filament 30 as it is unwound therefrom.

Joined to the outer sleeve 76 below the horizontal frame 78 is a filament arm 22 corresponding generally to the filament feeding arm shown in FIGS. 1–12. The arm 22 includes a transverse plate 92 which carries a downwardly extending tube 94 at its free end. The tube 94 is joined to the end of the plate 92 by a bushing 96 fixed to the tube 94 in abutment with the surface of the plate 92, and a flange 98 threadably engaged with the upper end of the tube 94 and in abutment with the upper surface of the plate 92. The flange 98 is of smoothly curved and finished construction to minimize sliding friction of the filament 30 sliding therethrough. The lower end 100 of the tube 94, as best shown in FIGS. 17–19, is constructed and arranged to allow four filaments 30 to be fed therefrom, from the respective spools 80. To this end, the bottom inward side surface of the tube 94 is cut out along a flat plane as at 102, and a spacer plate 104 is seated against this surface. The spacer plate 104 carries along its interior surface a horizontally extending guide rod 106 of a cylindrical configuration which is preferably constructed of a phenolic resin or the like to provide a smooth surface for changing the direction of the filaments 30 as they leave the lower end 100 of the tube 94. Likewise, the rod 106 may be rotatably journaled in the plate 104, as desired. A gasket 107 of silicone rubber or the like is mounted adjacent the outer surface of the spacer plate 104; and a second spacer plate 108 is joined to the outside of the gasket 107 as by four machine screws 110. The lower machine screws 110 are joined to a bottom plate 112 which closes off the end 100 of the tube 94.

The second spacer plate 108 has opposed extending pins 114 which carry a guide plate 116. In this regard, the guide plate 116 has opposed arcuate slots 118 for engagement with the pins 114, and parallel vertical slots 120 through which are received the individual filaments 30 from the filament spools. The guide plate 116 is preferably constructed of a plastic material as necessary to reduce to the minimum extent any friction between the filaments 30 as they slide out the slots 120.

Suitable filament guide means 121 as illustrated in FIG. 16 are carried by the frame 78 to properly feed the filaments 30 from the spools 80 through the tube 94. While all four filaments 30 are shown to be threaded into the feeding arm 22 in FIG. 16, it will be appreciated that the actual number of filaments utilized is not critical. Thus, only one filament need be wound at any given time, or a relatively great number may be utilized, as is apparent.

As will now become apparent, rotary and longitudinal movement of the outer sleeve 76 is transmitted directly to the spool frame 78 and the feeding arm 22.

The movement of the outer sleeve 76 is controlled by a first drive means 122 which provides a rotary drive for the circular sleeve 54 and hence the outer sleeve 76 due to the splined engagement therebetween at 74. The outer sleeve 76 is also moved in a vertical or reciprocating path by a second drive means 124, as the outer sleeve 76 is slidable along the splined lower end 74 of the circular sleeve 54.

The first drive means 122 includes an electric motor 126 joined to the channel 48 by any suitable means such as bolts 128. Mounted below the motor 126 is a generator 130, driven from the motor through a pulley drive 132. The motor 126 may be of the direct current type, wherein the rotational speed thereof is variable. Joined to the drive shaft of the motor 126 is a worm gear 134, and joined to the circular sleeve 54 is a cooperating worm wheel 136.

The second drive means 124 includes an electric motor 138 similar to the motor 126, the motor 138 being mounted on the channel 48' as by bolts 140. Mounted to the underside of the upper plate 64 is a second adjustable speed generator 142 similar to the generator 130, a pulley 144 driving the generator 142 from the motor 138.

The lower plate 66 carries a mounting block 146, which in turn, carries a gear box 148. The gear box 148 receives a worm gear 150 carried by the output shaft of the motor 138. Passing vertically through apertures in the upper plate 64, gear box 148, mounting block 146, and the lower plate 66 is a threaded drive shaft 152. This shaft 152 threadably receives a worm wheel 154 mounted within the gear box 148 and driven by the worm gear 150. The worm wheel 154 is seated within gear box 148 so that rotary motion transmitted thereto by the worm gear 150 is transferred through the threaded engagement with the drive shaft 152 to a reciprocating and rotating motion, as is apparent. The upper end of the drive shaft 152 is supported by a horizontal plate 156 which is joined to long bolts 158, which pass vertically downwardly through guide blocks 159 in the upper frame portion 44. The bolts 158 are operatively joined at their lower ends to the outer sleeve 76 as at 160 in the manner as illustrated in FIGS. 13 and 14. The drive shaft 152 has a reduced upper threaded end 162 which is secured to the plate 156 as by bolt 164. The outer sleeve 76 has a flanged collar 166 fixed thereto carrying thrust bearings 168 and the bottom ends of the long bolts 158. A housing 170 is rotatably secured with respect to the flanged collar 166, by cooperative engagement with the thrust bearings 168. The housing 170 carries an upper transversely extending arm 172 which is positioned to receive and support the bottom end of the drive shaft 152. To this end, the drive shaft 152 has a reduced lower end 174 which freely passes through the arm 172 and is operatively joined thereto as by a bushing 176 and a nut 178. By this arrangement, the rotating and longitudinal screw-threaded movement of the drive shaft 152 is transmitted into longitudinal movement of the outer sleeve 76, as no rotating motion is transmitted through the housing 170, this motion being transmitted solely by the first drive means 122. Thus, as the worm wheel 154 is rotated in one direction or the other a corresponding longitudinal movement of the outer sleeve 76 along the splined lower end 74 of the central sleeve 54 is provided.

Reference will now be made to the means for supporting the mandrel 20 in the selected positions for wrapping the filaments 30 around the opposed planar surfaces thereof.

Extending upwardly from the lower frame portion 46 is a mandrel supporting stand 180 in the manner as illustrated in FIG. 13. Operatively positioned within the central sleeve 54 is an upper mandrel supporting means 182, and mounted for opposed horizontal movement below the apparatus 52 are opposed mandrel guide clamps 184, 184'. The upper mandrel guide means 182 includes a cylinder mounting sleeve 186 mounted concentrically within central sleeve 54 and supported at its upper end by a flange 188 resting on the upper bearing housing 62, as best shown in FIG. 15. The cylinder mounting sleeve 186 is closed at its lower end by a plate 190 having a threaded aperture therethrough. Threadably received in the aperture of the plate 190 is a fluid actuated cylinder 192 carrying a piston and piston rod 194 in downwardly extending relationship thereto. Mounted to the bottom of the piston rod 194 is a cylindrical head 196 carrying a 90° ramp type cam surface 198 actuated by cam pins 200. The cam pins 200 are carried by a sleeve 202; thus, as the head 196 is moved downwardly the pins 200 will ride along the cam surface 198 thereby rotating the sleeve 202 through an angle of 90°. Fixed to the bottom of the sleeve 202 is a flange plate 204 which has a sheet 206 of silicone rubber or the like bonded to the underside thereof.

The mandrel supporting stand 180 includes an upwardly extending fluid actuated cylinder 208 having an upwardly extending nonrotatable piston rod 210 extending therefrom. Carried by the upper end of the piston rod 210 is a mandrel table 212, the mandrel table 212 being freely rotatable with respect to the piston rod 210 by virtue of a thrust bearing connection therebetween as at 214 and as illustrated in FIGS. 20 and 21.

A vertically extending bracket plate 216 joined to the lower frame portion 46 carries a fluid cylinder 218 by a pivot connection 220. The cylinder 218 is thereby pivotable about a vertical axis at its rearward end. The cylinder 218 carries a free piston end 222 which is eccentrically joined to a locking collar 224 operatively connected to the mandrel table 212 as shown in FIG. 21. Thus, when the mandrel table 212 is moved to any operating position, actuation of the cylinder 218 will provide a positive means for locking of the table in the desired position.

The opposed horizontally extending clamping means 184, 184' includes bracket plates 226, 226' joined to the stanchions 38 and 40, each of which carry fluid actuated cylinders 228, 228' respectively. Inasmuch as the clamping means 184, 184' are identical the cylinder 228 will be described, equivalent elements of the cylinder 228' being designated by prime numerals. Carried by the piston rod 230, is a flange plate 232, the flange plate 232 being rotatable with respect to the piston rod 230, by a roller bearing connection therebetween carried in a housing 234 operatively joined to the ends of the piston rod 230.

Suitable control means 236 are conveniently positioned adjacent the apparatus for operating the drive means 122 and 124, the control means 236 including transformers 238 receiving, e.g. 220 volts signal phase voltage. The output of the transformers 238 is operatively connected to the motor control panels 240 of conventional construction, these motor control panels 240 being connected to a control panel 242 which is provided with an individual control for each of the electric motors 126 and 138. Any suitable control means well known in the art may be provided for this purpose, the control means per se for the motors in this embodiment of the winding apparatus forming no part of the present invention.

OPERATION OF THE WINDING APPARATUS

The operation of the apparatus will now be described. Reference also being had to FIGS. 20 and 21 where the significant elements of the apparatus shown in FIG. 13 are positioned for wrapping filaments 30 about the mandrel 20.

The apparatus is prepared for operation by mounting the filament spools 80 to the spool brackets 82, 82' and threading the four filaments 30 through the various filament guides and through the tube 94 of the feeding arm 22, and then outwardly from the bottom end 100 thereof through the vertical slots 120. The mandrel 20, of course, rests on the mandrel table 212, and the mandrel 20 is further stabilized by actuating the fluid cylinder 192 to move the rubber sheet 206 of the flange plate 204 downwardly into engagement with the top of the mandrel. The initial wrapping of the opposed planar walls of the mandrel 20 is accomplished as follows: The filament 30 is initially secured to the mandrel 20 by any convenient means such as securing the end thereof to an extending peg 21, the arm 22 being initially at its uppermost position. The drive means 122 and 124 are then actuated, the drive means 122 rotating the outer sleeve 76 through the motor 126, worm gear 134, worm wheel 136 and the splined portion 74 which, in turn, engages the outer sleeve 76, thereby rotating the arm 22 which is secured thereto. The second drive means 124 moves the outer sleeve 76 and the arm 22 in a downward path along the splined end of the circular sleeve 54. By this simultaneous movement, the filaments 30 will be wrapped about the opposed vertical planar surfaces of the mandrel 20, the arm 22 traversing further from its upper position to its bottom position by the motor 138, worm gear 150 and the threaded drive connection between the worm wheel 154 and the drive shaft 152. By virtue of the rotating connection between the outer sleeve 76 and the housing 170, the rotating and reciprocating movements are independent of one another. After the arm 22 has rotated and moved to its lowermost position, the opposed planar surfaces of the mandrel 20 are thereby effectively wrapped.

The horizontally extending fluid cylinders 228 are then actuated to support the mandrel 20 along its opposed vertical sides, the stroke of the cylinders being along an axis slightly offset from the center of gravity of the mandrel 20 such that mandrel 20 will tend to rotate 90° due to gravitational effect.

With the flange plates 232 and 232' holding the mandrel 20, the flange plate 204 is moved vertically upward by actuating cylinder 192. The locking collar 224 is then released by actuating the cylinder 218, allowing the mandrel table 212 to be moved downwardly by the cylinder 208. Removal of support from the mandrel table 212 allows the mandrel 20 to rotate 90° on the bearings for the flange plates 232 and 232'.

The cylinder 208 is again actuated to raise the mandrel table 212 to support the mandrel 20 in its new position. When the mandrel table 212 has reached its proper position, the cylinder 218 is again actuated to lock the table by means of locking collar 224. The cylinders 228 are again actuated and retracted clear of the winding tube 94.

The cylinder 192 is again actuated, moving the flange plate 204 downward until it contacts face of mandrel 20.

As the cylinder 192 continues to exert force downwardly, the cam pins 200 will actuate the ramp type cam surface 198 thereby rotating the sleeve 202 through a 90° angle. This will, in turn, cause the mandrel 20 to rotate through a 90° angle.

The mandrel 20 is now in the proper position for wrapping the next series of opposed planar surfaces and the arm 22 is energized by the first drive means 122 as previously described, and the second drive means is actuated in a reverse direction to move the rotating feeding arm 22 in an upwardly path, and the wrapping is thereby completed on the second planar surfaces. As this wrapping step is completed, the previously described cycle is repeated again so that the third planar position is assumed by the mandrel 20, thereby accomplishing a two-ply, bidirectional wrap on all surfaces of the mandrel 20. These three cycles may be repeated as often as desired to provide the necessary wall thickness for the container shell.

After the mandrel 22 has been wrapped as described, the filaments 30 are cut and secured as necessary, the wrapped mandrel 20 then being removed from the apparatus for subsequent curing, as previously described.

The tube 94 may be filled with suitable resin to provide impregnation of filaments 30. The silicone rubber gasket 107 has punched holes in the way of vertical slots 120. These punched holes are of proper diameter to prevent resin leakage when filaments 30 are passing through them. Regulation of this hole diameter serves the additional function of squeezing excess resin out of the filament, thereby controlling resin content of finished product.

Likewise, the mandrel 20 according to this invention may be a previously packed container or a container which is resistant to the pressure and temperatures of the subsequent curing of the bonding resin, thereby obviating the requirement of slitting the formed shell from the mandrel 20.

The rectangularly shaped container, which is produced according to the practice of the invention, generally includes a bidirectional wrap on each of the planar surfaces or a multiplicity thereof so that a cross section of the surface provides a pair of layers of filaments, one of which is generally perpendicular to the plane of the other. The actual number of layers of filaments depends generally on the desired container wall thickness. Numerous modifications of the winding step can be provided, such as the increased local region thickness in portions of the container. This may be accomplished by simply slowing the longitudinal speed of the arm 22 with respect to the rotary speed thereof. In a preferred form of thickness buildup, the feeding arms are reciprocated a number of times in the local region where thickness is desired.

FULLY AUTOMATIC WINDING APPARATUS

The preferred apparatus 300 for practicing the methods of the present invention is more fully illustrated in FIGS. 22-63. The apparatus 300 is fully automated in its operation and may be programmed for the complete winding of a mandrel without constant manual attention.

The apparatus 300 generally comprises an outer frame forming housing 301, which includes a base housing 302 having four depending legs 302' secured to the bottom wall thereof. Formed with and extending upwardly from the base housing 302 are four upright stanchions 303 which are located at the corners of a rectangular plane. Furthermore, the stanchions 303 are rectangular in horizontal cross section and each of which is formed by a pair of abutting U-shaped parallel channels, which are joined along their longitudinal margins. Welded or otherwise rigidly secured to the upper ends of the stanchions 303, and carried thereby is a rectangularly shaped upper support structurue 304, which is further reinforced by triangularly shaped gussets 304' secured to the stanchions 303 and to the frame structure 304, in the manner as illustrated in FIG. 22.

The upper frame structure includes a pair of longitudinally extending supports 305 and extending therebetween are a pair of longitudinally spaced, transversely extending supports 305'. Similarly extending between the supports 305' are longitudinally extending intermediate supports 305", as illustrated in FIG. 23. Extending upwardly of the upper support structure 304 in the manner as illustrated in FIGS. 22-24 are three spaced guide rods 306. Similarly extending upwardly of the upper frame structure 304 is a jack screw or jack shaft 307. The jack screw 307 and the guide rod 306 extend through apertures formed in a support plate 308, the latter being supported in the intermediate supports 305" and removably retained on the upper end of the upper frame structure 304 by means of eye bolts 309, in the manner as illustrated in FIGS. 23 and 24. Rigidly secured to the upper end of each of the guide rods 306 and to the jack screw 307 is a top plate 310. The guide rods 306 and the jack screw 307 are provided with an upper threaded portion 311 for the accommodation of locking nuts 312.

Figure 25:
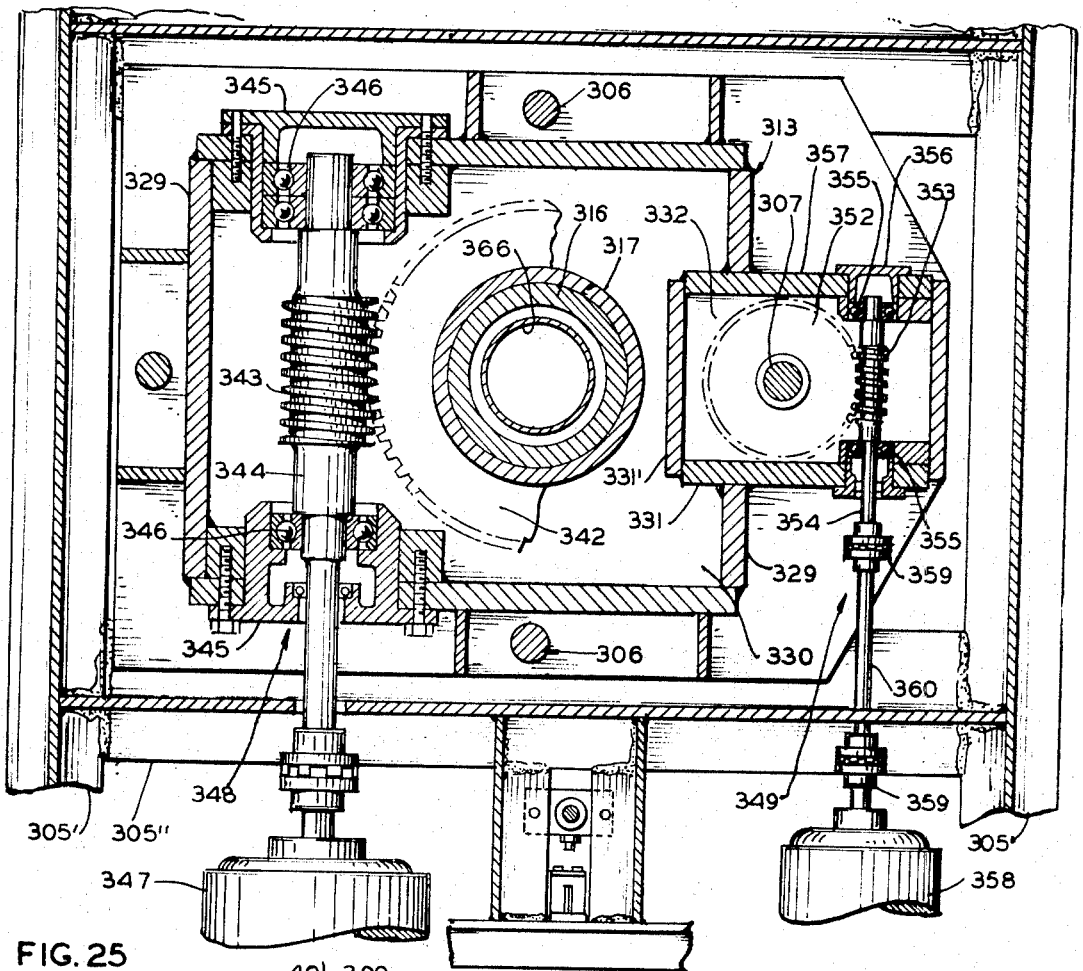
FIG. 25 is a horizontal fragmentary sectional view taken along line 25—25 of FIG. 24 and showing a portion of the drive mechanism therein.

The guide rods 306 and the jack screw 307 extend downwardly into a drive housing 313, which is more fully illustrated in FIGS. 24 and 25. At their lower ends, the guide rods 306 and the jack shaft 307 are externally threaded and support a main mounting plate 314 in the manner as illustrated in FIG. 26. The mounting plate 314 is, in turn, retained on the lower end of the guide rod 306 and the jack shaft 307 by means of locking nuts 315.

The main drive housing 313, which is more fully illustrated in FIGS. 24 and 25 is located in the upper support structure 304. The drive housing 313 includes suitable mechanism, which is designed to provide both rotating movement and vertical shifting movement. The shaft 316 is rigidly secured to an outer quill shaft 317 and rotatable therein by means of locking pins 318 so that the outer quill shaft 317 is rotatable with the main drive shaft 316 in the manner as illustrated in FIG. 24. The lower end of the quill shaft 317 is rigidly secured to a bearing housing 319, which includes tapered roller bearings 320 enabling rotatable movement of the main drive shaft 316. The upper end of the quill shaft 317 is also secured to a similar bearing housing 321 having tapered internal roller bearings 322 which also provide for the rotatable movement of the main drive shaft 316 within the outer quill shaft 317.

The main drive housing 313 includes a plurality of depending I-beams secured at their upper ends to the underside of the support plate 308 and are located in the form of a rectangular frame. A plurality of support bars 324 extend inwardly from the I-beams 323. A base plate 325 is secured to the bearing housing 319 in the manner as illustrated in FIG. 24 and is also supported by the lower ends of the I-beams 323. The support plate 308 is provided with a large central aperture 327 and removably disposed over the support plate 308 is a cover plate 328, which in turn, supports the upper bearing housing 321 in the manner as illustrated in FIG. 24. Thus, it can be seen that the cover plate 328 can be removed and will carry therewith the upper bearing housing 321.

The main drive housing 313 is also provided with four spaced end walls 329 secured to the support bars 324 and form an internal compartment 330. Furthermore, it can be seen that one of the end walls 329 is rectangularly apertured to accommodate a smaller rectangular housing 331 having side walls 331' and forming an internal compartment 332 for reasons which will presently more fully appear. Each of the guide rods 306, moreover, is reciprocatively supported in the main drive housing 313 by means of linear ball bearings 333. The guide rods 306 are reciprocatively supported in the cover plate 328 by means of similar linear bearings 334 in the manner as illustrated in FIG. 24.

Rigidly secured to the support plate 308 and extending upwardly through the cover plate 328 are a plurality of eye bolts 335, which are capable of being engaged by conventional hooks and lifting mechanism (not shown) for removing the entire main drive housing 313. The cover plate 328 is also provided with a plurality of eye bolts 335' for engagement by conventional hooks so that the plate 328 may be lifted from its closurewise position, thereby providing access to the interior of the main drive housing 313. Furthermore, the housing 313 is entirely sealed along the end walls 329 and the base plate 325 so that it is capable of accommodating a conventional lubricating fluid. The cover plate 328 is apertured for accommodating a pair of grommets 336, which are capable of removably receiving dip sticks 337, 338. By reference to FIG. 10, it can be seen that the dip stick 337 is capable of being inserted into the internal compartment 330 for determining the oil level therein, and the dip stick 338 is capable of being inserted into the compartment 332 for determining the oil level in this compartment.

Concentrically disposed about the quill shaft 317 and being rigidly secured thereto by means of locking pins 339 is a diametrically enlarged hub 340. Rigidly secured to the underside of the hub 340 by means of machine screws 341 is a sprocket 342. The sprocket 342 is disposed in meshing engagement with a worm gear 343, the latter being integrally formed with or otherwise secured to a worm shaft 344. The side walls 331 are transversely apertured for accommodating conventional ball bearing housings 345, which contain conventional ball bearings 346 for journaling the worm shaft 344 therein. The worm shaft 344 is, in turn, connected to a conventional D.C. electric motor 347 for actuation of the worm gear 343. Thus, it can be seen that as the motor 347 is energized, it will rotate the worm shaft 344 and the worm gear 343, which will in turn rotate the sprocket 342. Since the sprocket 342 is rigidly secured to the main drive shaft 316, by means of the pins 318, the drive shaft 316 will also rotate therewith.

It can be seen that the electric motor 347 is rigidly mounted within the upper frame structure 304 in the manner as illustrated in FIG. 23. In essence, therefore, it can be seen that the combination of the electric motor 347, the worm gear 343 and the sprocket 342 and all of the intermediate components associated therewith, as previously described, form a rotating drive mechanism 348. Moreover, it can be seen that this rotating drive mechanism 348 is located in the compartment 332 of the main drive housing 313.

The main drive housing 313 is also provided with a reciprocating drive mechanism 349, which is located in the compartment 330 and is also more fully illustrated in FIGS. 24 and 25. The jack shaft 307 is concentrically disposed within a gear tube 350 serving as a drive tube and which is provided with threads 351 on its interior surface for meshing engagement with the exterior threads of the jack shaft 307. Concentrically disposed about and being rigidly secured to the gear tube 350 is a worm gear 352. The worm gear 352 is disposed in meshing engagement with a worm gear 353, the latter being mounted on a worm shaft 354, which is, in turn, journaled in ball bearings 355. The ball bearings 355 are retained within bearing housings 356, the latter being inserted in apertures formed in end walls 357, which are, in turn, secured to the side walls 329. The worm shaft 354 is, in turn, connected to a conventional D.C. electric motor 358 by means of couplings 359 and an intermediate drive shaft 360.

By further reference to FIG. 24, it can be seen that the gear tube 350 is supported by the upper tapered roller bearings 361, which are secured to a bearing support bracket 362, the latter being in turn mounted in the wall 329 of the housing 319. The lower end of the gear tube 350 is similarly supported in tapered roller bearings 363, which are, in turn, mounted in a bearing housing 364, the latter being secured to the base plate 325 of the main drive housing 313. Thus by means of the above-outlined construction, it can be seen that as the electric motor 358 is energized, it will rotate the intermediate drive shaft 360, the worm shaft 354 and the worm gear 353. This will, in turn, cause rotation of the worm gear 352. Since the jack shaft 307 is disposed in meshing engagement with the worm tube 350, the jack shaft will reciprocate in a vertical direction. The upward and downward movement of course, depends upon the direction of rotation of the worm gear 353 and the worm gear 352. However as the jack shaft 307 is raised, it will carry therewith the plate 310 and the guide rods 306.

Secured to the upper end of the bearing housing 321 by means of bolts 365 and extending concentrically within the main shaft 316 is a cylinder supporting sleeve 366. The main support shaft 316 is open at its lower end and the cylinder support sleeve 366 extends downwardly therefrom in the manner as illustrated in FIG. 26. Rigidly secured to and disposed concentrically within the cylinder support sleeve 366 is a conventional hydraulic cylinder 367 having a movable piston 368. Secured to the lower end of the piston 368 and being rotatable with respect thereto is a stabilizing or so-called "clamping" plate 369. The cylinder 367 is actuated by hydraulic fluid lines 369' which are connected to a fluid control circuit to be hereinafter described in more detail.

Referring now to FIG. 26, it can be seen that a roving feed assembly 370 is operatively secured to and operable by the main shaft 316. An outer vertically shiftable sleeve 371 forming part of the roving feed assembly 370 is concentrically disposed about the main shaft 316. The vertically shiftable sleeve 371 is provided with a series of internally extending keys 372 which extend into mating keyways formed in the annular surface of the shaft 316 permitting vertically shiftable movement of the sleeve 371. The sleeve is secured to a bearing housing 373 at its upper end which is, in turn, secured to the mounting plate 314 by means of screws 374. The bearing housing 373 is provided with a series of tapered roller bearings 375 for permitting vertically shiftable movement of the sleeve 371 with respect to the main shaft 316. Furthermore, the sleeve 371 is keyed to the shaft 316 as indicated above and is rotatable therewith. Furthermore, it can be seen that as the mounting plate 314 is shiftable through the action of the jack screw 307 that the vertically shiftable sleeve 371 is also shiftable therewith.

Similarly secured to the shiftable sleeve 371 and being carried therewith is a spool support frame 376 which is provided with a resin housing 377 in the manner as illustrated in FIG. 26. It can be seen that the resin housing 377 is retained by means of an annular ring 378 and a locking nut 379. Depending from the upper end of the resin housing are a pair of internally threaded sleeves 380 for holding filament feeding arms 381 or so-called "feeding tubes." Furthermore, it can be seen that the feeding arms 381 are provided with a central bore 382 for accomfilament strands therethrough. Secured to the upper ends of the feeding arms 381 are funnels 383 which extend into the liquid resin contained within the resin housing 377.

Figure 28:
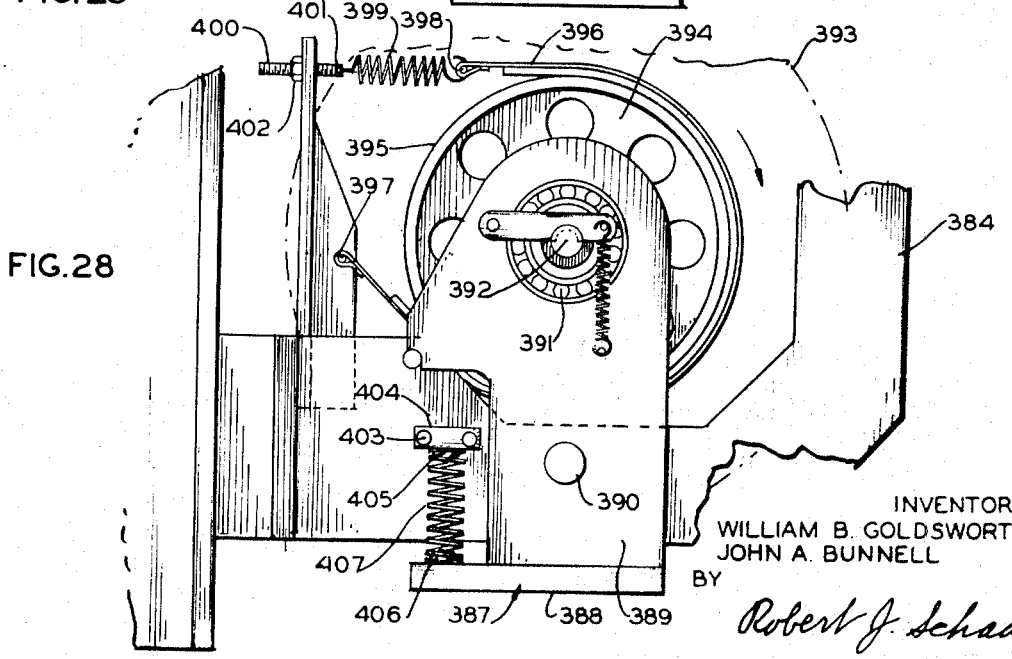
FIG. 28 is a vertical fragmentary sectional view taken along line 28—28 of FIG. 27 and showing a portion of the filament dispensing mechanism forming part of the present invention.
Figure 27:
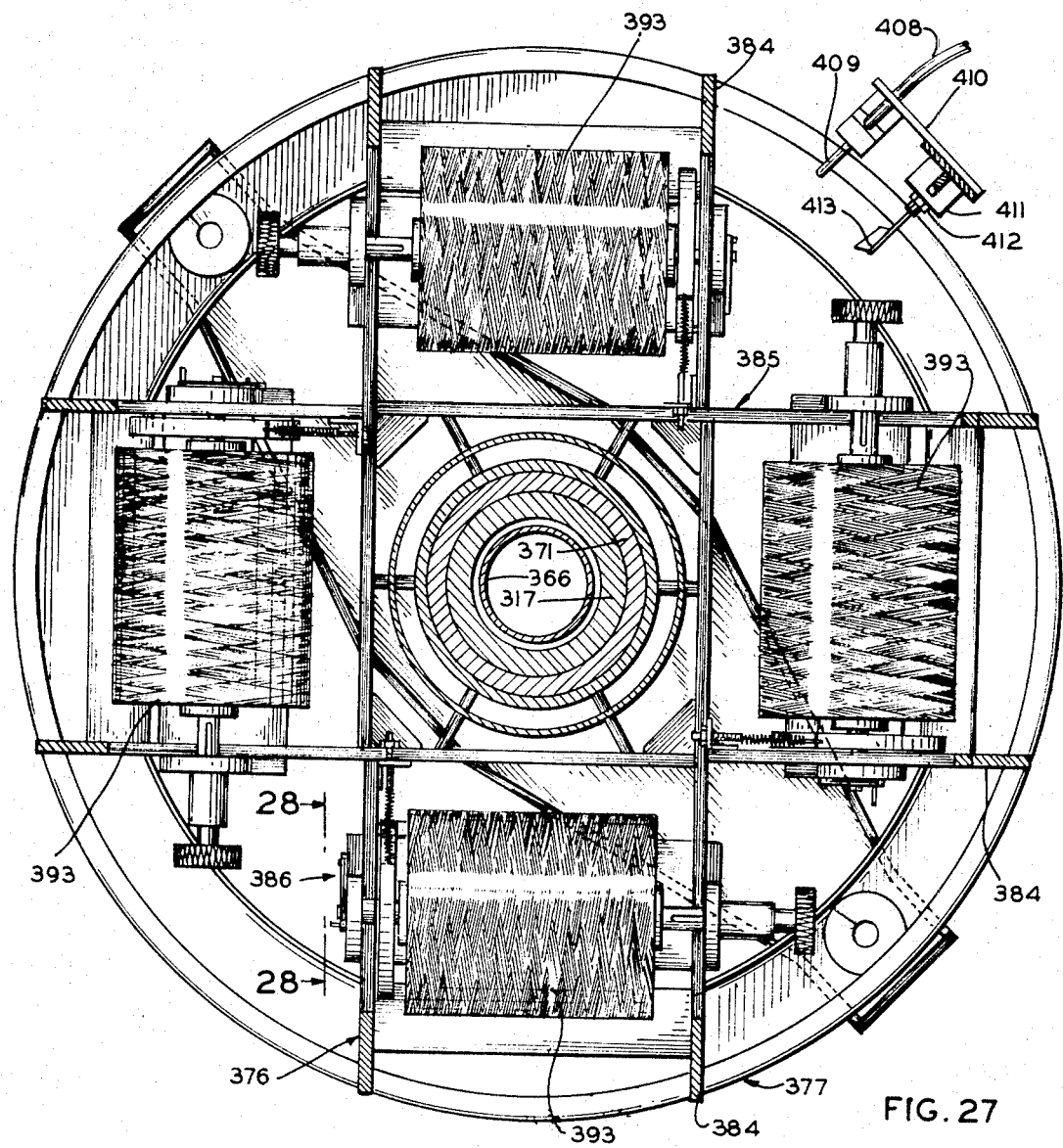
FIG. 27 is a horizontal fragmentary sectional view taken along line 27—27 of FIG. 26.

Also secured to the sleeve 371 and extending radially therefrom are pairs of circumferentially spaced outwardly extending L-shaped brackets 384. The L-shaped brackets 384 form a circular grid-frame 385 which is more fully illustrated in FIG. 27 for supporting four circumferentially spaced filament dispensing mechanisms 386, the latter being more fully described in my copending application Ser. No. 690,495, filed Dec. 14, 1967, now U.S. Pat. 3,540,675, dated Nov. 17, 1970. One of the filament dispensing mechanisms 386, however, is also illustrated in FIG. 28 and includes a pivotal cradle 387. The cradle 387 includes a base plate 388 having a pair of upstanding end walls 389. Furthermore, it can be seen that the end walls 389 are pivotally mounted on the grid-frame 385 by means of shoulder bolts 390. The shoulder bolts are conventionally provided with annular shoulders (not shown) which bear against the exterior surface of the upstanding brackets 384 and thereby provide a tiltable movement between the upstanding brackets 384 and the cradle 387. The outer ends of the end walls 389 are apertured to accommodate conventional ball bearings 391. Journaled in the ball bearings 391 is a support shaft 392 for holding conventional spools of filament 393 in the manner as illustrated in FIG. 27 and FIG. 28.

A circular brake drum 394 is keyed or otherwise secured to the support shaft 392 and is provided with an annular braking surface 395. The braking surface 395 may be formed of stainless steel, asbestos or any material normally employed in brake drums of this type. A brake belt 396 is terminally looped at one end and is secured to a dowel 397 which is, in turn, secured to the upstanding bracket 384. The opposite end of the brake belt 396 is also terminally looped and secured to a pin 398 which forms part of a tension spring 399. The opposite end of the tension spring 399 is secured to a bolt 400 having a dowel 401 for engaging the tension spring 399 in the manner as illustrated in FIG. 28. The bolt 400 also extends through an aperture formed in the upstanding bracket 384. The bolt 400 is threaded for most of its axial length. It is, therefore, possible to adjust the tension on the brake belt 396 by merely turning a hexagonal jam nut 402 and urging a greater portion of the shank of the bolt 400 through the aperture in the bracket 384. The underside of the brake belt 396 is also provided with a suitable brake medium such as asbestos or the like and which bears against the braking surface 395.

Secured to the exterior surface of the L-shaped bracket 384 by means of bolts 403 is an outwardly extending retaining block 404 having a downwardly presented boss 405 on its underside. Similarly mounted on the base plate 388 of the cradle 387 is an aligned boss 406 and mounted upon each of the cooperating bosses 405, 406 is a compression spring 407 which biases the entire cradle 387 in a counterclockwise direction, reference being made to FIG. 28. Thus, it can be seen that the entire spool assembly and cradle 387 is pivoted in such a direction so as to release the brake belt 396 from engagement with the brake drum 394 by reducing tension on the brake belt 396. In essence, the spring 407 balances the weight of the filament spool and any forces imposed thereupon about the axis of pivotal movement of the cradle 387 which extends through the axial centerline of the bolt 390.

The remainder of the structure of the filament dispensing mechanism is more fully illustated and described in the aforementioned copending application Ser. No. 690,495, filed Dec. 14, 1967 now Pat. No. 3,540,675. Furthermore, this type of system is specifically designed for application of this type so that uniform tension on the device throughout the payout life of the speed is maintained.

Resin is supplied to the resin housing 377 by means of a resin supply line 408, which is in turn connected to a suitable source of liquid resin (not shown). The resin line 408 terminates in a feeding tube 409, which is stationary with respect to and is designed to admit liquid resin into the open upper end of the housing 377 in the manner as illustrated in FIG. 27. The feeding tube 409 is conventionally mounted on a support plate 410, which is in turn, secured to one of the stanchions 303. Also secured to the support plate 410 is a liquid level switch 411, which is electrically connected to and controls the input of fluid to the resin housing 377 by means of a pilot switch 412. The liquid level switch 411 is a conventional device and is, therefore, neither illustrated nor described in further detail herein. However, this device is generally a flag-operated device which includes a depending flag 413 disposed within the trough of the housing 377. The amount of biased movement of the flag 413 generates a control signal which is in turn transmitted to the pilot operated switch 412 for actuating the same.

Secured to the upper end of each of the L-shaped brackets in the manner as illustrated in FIG. 26 is a circular support ring 414, for supporting conventional take-off rollers (not shown). Generally, the filament strands from each of the four spools are trained over the rollers and threaded through the bore 382 of the feeding tubes 381. In essence, a pair of strands are passed through each of the feeding tubes 381 so that a total of four individual strands may be found on a mandrel M at any time.

Secured to the lower ends of each of the filament feeding tubes 381 by means of knurled nuts 415 are filament feeding heads 416 which are more fully illustrated in FIGS. 29–33. The feeding head 416 generally comprises a rectangularly shaped tube 417 which is secured to a circular top plate 418, the latter in turn being retained by a flange on the knurled nut 415 in the manner as illustrated in FIG. 31. Disposed within the tube 417 is a relatively hard steel section 419 and a polyethylene foam section 420 which abut against each other. In essence, the two sections are separated by a thin filament passageway 421. The filament strands from the spools 393 are passed through an aperture 422 formed in the top plate 418 and a tapered recess 423 formed in a neoprene rubber section 424. By reference to FIG. 31, it can be seen that the neoprene rubber section 424 is disposed upon the upper surface of the foam 420 and the steel sections 419.

The bore 382 of the filament feeding tube 381 is connected to the resin housing 377 so that resin passes through the aperture 422 and into the foam section 420. The amount of resin that can be held by the foam section 420 is regulated by an adjustable bolt 425 which is secured to the underside of the tube 417 by means of a sleeve 426 and locking nut 427. By adjusting the bolt 425 so that it extends upwardly within the tube 417, it is possible to compress the foam section 420 and thereby diminish the amount of liquid resin that the section 420 can hold. Conversely, by releasing the bolt 425, it is possible to reduce the compression of the foam section 420 thereby enabling the latter to hold more of the liquid resin. The steel section 419 which bears against the surface of the foam section 420 is retained by a plurality of bolts 428.

Also secured to the lower end of the tube 417 are a pair of spaced guides 429 having guide surfaces 430 for accommodating each of the filament strands which pass therethrough. As indicated previously, filament strands from two of the spools 393 are passed through each of the filament feeding tubes 381. Furthermore, by reference to FIG. 30, it can be seen that one of the guides 429 is located on a slightly higher plane than the other of the guides 429 in order to wrap the roving strands around the mandrel in adjacent abutting relationship.

Rigidly secured to the top plate 310 and extending outwardly therefrom is a light bar support bracket 431 which is provided at its upper end with suitable terminal connections 432 for electrical connection to a control circuit to be hereinafter described in more detail. Secured to the bracket 431 is a downwardly extending light bar 433 which is also concentrically movable within a cylindrical guide sleeve 434, the latter in turn being secured to the upper support structure 304 in the manner as illustrated in FIGS. 22 and 36. At its lower end, the light bar 433 is provided with a support plate 435 for retaining a pair of actuating lights 436 in the manner as illustrated in FIGS. 34, 35. The actuating lights 436 are connected to the connectors 432 through conductors 437, which extend through a hollow portion of the bar 433.

Rigidly secured to the interior surface of one of the stanchions 303 are a pair of brackets 439 which in turn support a connector block 440. The connector block 440 is provided with a series of vertically aligned receptacles 441 for accommodating suitable photocells 442. Furthermore, the block is internally bored and provided with an aperture 443 for accepting lead lines 444 from each of the receptacles 441. By means of this construction, it is possible to program the vertical shifting movement of the feeding arms 381. Furthermore, by reference to FIG. 36, it can be seen that the two rows of receptacles 441 are slightly offset with respect to each other at the same distance that the two actuating lights 436 are offset with respect to each other. Accordingly, when one light 436 is in line with a receptacle in one vertical column, the other actuating light 436 will be disposed between two receptacles 441 of the opposite vertical column.

Operatively mounted in the base housing 302 is a mandrel support and shift device 445 which is more fully illustrated in FIGS. 37–43. The mandrel shift and support device 445 is generally mounted in an elongated slot 446 formed in the base housing 302 and in the stanchions 303, in the manner as illustrated in FIGS. 22, 37 and 38. Extending longitudinally between the stanchions 303 and being welded or otherwise rigidly secured thereto are pairs of transversely spaced upper and lower U-shaped support channels 447 and 448. Similarly welded or otherwise rigidly secured to the support channels 447, 448 and the stanchions 303 are semicircular rail supporting plates 450 and secured to the rail support plates 450 by means of spacing plates 451 are semicircular trackways 452. By reference to FIGS. 37 and 39, it can be seen that these semicircular trackways 452 are mounted upon opposite sides of the longitudinally extending slot 446.

A mandrel support carriage 455 is shiftable along the semicircular trackways 452 and generally comprises a U-shaped frame 456 including a pair of downwardly extending transversely spaced roller support plates 457. Integrally formed with the support plates 457 are three arcuately spaced pairs of radially extending ears 453 which are formed with laterally struck retaining blocks 454. The blocks 454 are capable of engaging the underside of the guide rail 452 to prevent any upward jaring of the carriage 455. Secured to the plates 457 by means of pins 458 are flanged rollers 459 which are movable along the trackways 452 in the manner as illustrated in FIGS. 38 and 39. By additional reference to FIGS. 38 and 39, it can be seen that the frame 456 is reinforced by transversely extending support members 460. Secured to one of the plates 457 on the interior surface thereof, is a semicircular rack 461, which extends for the entire length of the carriage 455.

Rigidly mounted upon a motor support frame 462, which is in turn secured to a base housing 302, is a conventional hydraulic motor 463 or so-called "rotac." The rotac 463 is provided with a drive shaft connected to a conventional universal joint 464. A drive shaft 465 is journaled in a conventional bearing housing 466 and provided on its terminal end with a large pinion gear or so-called "drive gear" 467. By reference to FIG. 39, it can be seen that the gear 467 meshes with the rack 461 and by means of this structure drives the carriage 455. It can also be seen that by reversing the operation of the rotac 463, it is possible to drive the carriage 455 along the semicircular trackways 452 in either a clockwise direction or a counterclockwise direction, reference being made to FIG. 38. Rigidly mounted on the opposed stanchions 303 and extending into the semicircular slot 446 are a pair of support plates 468, 469 for retaining hydraulic deceleration valves 470, 471 respectively. The valves 470, 471, are designed to slow down its end positions in a manner to be more fully described in detail hereinafter. Similarly mounted on the stanchions 303 and being disposed in the semicircular slot 446 in alignment with the carriage 455 are U-shaped retaining brackets 472 for holding limit switches 473. The limit switches 473 are designed to stop the movement of the carriage 455 as it swings between its two ends positions.

Rigidly mounted on the carriage 455 in the manner as illustrated in FIGS. 38 and 39 are a pair of mandrel support mechanisms 474 and 475 which are located at right angles with respect to each other. Each of the mandrel support frames is substantially identical in construction and, therefore, only one of the mechanisms 474 will be described in detail hereinafter. The mandrel support mechanism 474 is rigidly mounted on the frame 456 and comprises a circular bracket 476, which is mounted on the top plate of the frame 456. Mounted on the underside of the top plate of the frame 456 is a hydraulic cylinder 477 having a movable piston rod 477' which extends upwardly from the top plate of the frame 456. Rigidly mounted on the circular bracket 476 is a hydraulic motor 478 or so-called "rotac," which is conventional in its construction and is designed to create actuation through 90° movements. The motor 478 is, in turn, provided with a drive shaft 479 to which is secured a mandrel support plate 480. Thus, by actuation of the motor 478, it is possible to rotate the mandrel support plate 480 through a 90° clockwise rotation, and a 90° counterclockwise rotation. Furthermore, by actuation of the hydraulic cylinder 477, in a manner to be hereinafter described in detail, it is possible to raise or lower the mandrel support plate 480.

The mandrel support plate 480 is rectangular in horizontal cross section and is provided with four upstanding Teflon support blocks 481, located at each of the corners of the support plate 480. The mandrel support plate 480 is more fully illustrated in FIGS. 40–43 and is actually in the form of a rectangular container having a hollow interior. Rigidly secured to and extending outwardly from one end of the mandrel support plate 480 is a conventional hydraulic cylinder 482 having a hydraulic inlet line 483 and a hydraulic outlet line 484. Furthermore, the hydraulic cylinder 482 is provided with a movable piston rod 485. The hydraulic cylinder 482 is double acting, and is, therefore, capable of driving the piston 485 in either direction.

Rigidly secured to the outer end of the piston 485 is a clamping frame 486 which comprises a rectangular block 487 and secured to the upper end of the block 487 is a pair of L-shaped retaining brackets 488. Also secured to the block 487 is a rack bar 489 which is shiftable therewith and contains a line of rack teeth 490. Mounted on the interior of the support plate 480 is a pivotal shaft 491 which retains a rotatable pinion gear 492, the latter being in meshing engagement with the rack teeth of the rack bar 489. By further reference to FIG. 42, it can be seen that the rack bar 489, which is movable with the clamping frame 486 is shiftable in an elongated slot 493, the latter being formed within the support plate 480. In like manner, a second rack bar 494, which is movable in an elongated slot 495 formed in the support plate 480 is secured to a second clamping frame 496.

By reference to FIGS. 40 and 41, it can be seen that the clamping frame 496 is located on opposite sides of the support plate 480 with respect to the clamping frame 486. In like manner, the clamping frame 496 includes a rectangular block 497 and, in turn, retains a pair of upstanding L-shaped retaining brackets 498. Thus, it can be seen that as the hydraulic cylinder 482 is actuated, it will shift the clamping frame 486 outwardly and will also shift the clamping frame 496 through the action of the rack bars 489 and 494. Accordingly, each of the clamping frames will move inwardly and outwardly in timed relationship with respect to each other through the actuation of the hydraulic cylinder 482. The mandrel support plate is provided on its upper surface with a limit switch 499 for reasons which will presently more fully appear.

The mandrel support mechanism 475 is substantially identical to the mandrel support mechanism 474 and includes a hydraulic cylinder 477a with a movable piston 477a'. Secured to the upper end of the piston rod 477a' is a 90° rotational motor or so-called "rotac" 478a'. Similarly secured to the upper end of the rotac 478a' is a mandrel support plate 480a and which is also provided with a hydraulic cylinder 482a, the latter being substantially identical to the hydraulic cylinder 482. In like manner, the mandrel support plate 482a is provided with clamping frames 486a, 496a.

By referring again to FIGS. 22–43, the basic elements of the mode of operation of the apparatus 300 can be more fully understood. By energization of the electric motor 358, the drive shaft 360 will rotate the worm gear 353 in the manner as more fully illustrated in FIGS. 24 and 25. Rotation of the worm gear 353 by meshing engagement with the spur gear 352 will rotate the gear tube 350 and thereby raise or lower the jack shaft 307. Since the jack shaft 307 is operatively secured to the guide rods 306 through the top plate 310, this entire structure will shift vertically. The shifting movement of the guide rods will also raise and lower the mounting plate 314 and this will, in turn, raise or lower the filament feeding arms 381, and the entire structure which is carried by the mounting plate 314. In addition, the hydraulic cylinder 367 can be actuated to engage the mandrel M in timed relationship to the shifting movement of the mandrel support plates 480, in a manner more fully described in detail hereinafter.

Referring again to FIGS. 24 and 25, it can be seen that energization of the electric motor 347 will rotate the worm gear 343 and hence the sprocket 342. This will, in turn, rotate the main drive shaft 316, by means of the structure more fully illustrated in FIG. 24. Accordingly, it can be seen that it is possible to obtain both rotational and vertically reciprocative movement of the main drive shaft 316.

It can be seen that if a mandrel M is disposed upon one of the mandrel support plates 480, the fiberglass filament extracted from the spool 393 can be wound on the mandrel M through the feeding arm 381. As indicated previously, the filament will be dispensed from the spool 393 at a controlled rate. The filament is threaded through the bores 382 of each of the feeding arms 381 and outwardly through the feeding heads 416. Furthermore, it can be seen that liquid resin from the resin housing 377 will be also drawn through the bore 382 and into the feeding head 416. However, as indicated previously the amount of resin which is entrained in the filament strands can be controlled by adjustment of the bolts 425. The two filament strands will be carried around the guide surfaces 430 of the guides 429 and hence to the mandrel M where it is wound thereupon. It should be recognized that the feeding heads 416 also serve as resin sealing units and as a means for stripping excess resin from the filament.

Upper and lower movement of the feeding arms 381 is controlled by the photocell and actuating light combinations more fully illustrated in FIGS. 34–36. This structure, however, is defined in more detail hereinafter. While this type of structure controls a vertical shifting movement, it can be seen that the feeding arms 381 could not be located in the same vertical plane as the two mandrel support plates 480 during resting movement thereof, inasmuch as the feeding arms 381 would interfere with shiftable movement of the mandrel support plates. Accordingly, a second actuator light 500 is mounted on one of the upstanding brackets 384. This light 500 will prevent resting movement of the feeding arms 381 in various selected positions when it is coincident with permanently mounted photocells 501 on the stanchions 303.

The two mandrel support mechanisms 474, 475 are also capable of shifting through 90° arcs and furthermore are movable with each other on the carriage 455. Hence, it can be seen by reference to FIG. 38 that the mandrel support mechanism 474 can be shifted to a horizontal position, that is 90° to the right and the mandrel support mechanism 475 can be shifted to a substantially vertical position, which is also 90° to the right. It can also be seen that the mandrel support plates 480 can be both rotated through 90° movements and can be raised and lowered.

In addition to the shiftable movement and the rotatable movement of the mandrel support plates 480, it can be seen that the clamping frames 486, 496 will also move in timed relationship to the rotation or shifting movement of the mandrel support plates 480. These clamping frames 486, 496 will move so as to engage the mandrel M disposed upon the plate 480 during shifting movement of the plate 480 and during the winding operations.

Fluid Control Circuit

The aforementioned mechanical components forming part of the apparatus 300 of the present invention are operated by a fluid control circuit 502 illustrated in FIG. 56 and an electrical control circuit 503 illustrated in FIG. 57. The major portion of the components forming part of the hydraulic circuit 502 are located in a cabinet 504 which is secured to the side wall of one of the stanchions 303. The major portion of the electrical components forming part of the electrical circuitry 503 are located in a cabinet 505 which is secured to the opposite stanchion 303 in the manner as illustrated in FIG. 22.

The hydraulic circuit generally comprises a clamp control spool valve 506 which is, in turn, connected to a pressure fluid source P and is also connected to the hydraulic cylinder 367 in the manner as illustrated in FIG. 56. Furthermore, a flow controller 507 is also interposed in one of the lines between the valve 506 and the hydraulic cylinder 367. By further reference to FIG. 56, it can be seen that the drum of the spool valve 506 is provided with a forward position 508 and a reverse position 509. The hydraulic circuit 502 also includes a rotac control spool valve 510 which includes a forward position 511 and a reverse position 512. In like manner, the control valve 510 is connected to the source of fluid under pressure P. The control valve 510 is also connected to each of the rotacs 478 and 478a in the manner as illustrated in FIG. 56. In addition, flow controllers 513, 514 are located in each of the lines extending between the rotacs 478, 478a and the control valve 510.

The control ciricuit 502 additionally includes a pair of mandrel support control valves 515, 516 which are preferably of the spool valve type and each contain a drum 517 having a forward position 518', a reverse position 518" and a no-flow position 518". Furthermore, it can be seen that the control valves 515, 516 are connected across the opposite ends of the hydraulic cylinders 477a and 477, respectively. Interposed in one of the lines extending between the control valve 515 and the cylinder 477a is a flow controller 519 and a hydraulic operated fluid lock 519'. Similarly interposed within the lines extending between the control valve 516 and the cylinder 477 is a flow controller 520 and a hydraulic operated fluid lock 520'. The fluid locks 519', 520' are designed to prevent any creeping of the cylinders 477 and 477a in the no-flow positions. In other words, no fluid can be either admitted to or withdrawn from the cylinders 477, 477a through the action of the locks 519', 520' until fluid is controllably admitted to the cylinders.

The control circuit 501 also includes a carriage control valve 522 which is of the spool type and contains a forward position 522' and reverse position 522". The control valves 515, 516 and 522 are all connected to the fluid pressure, source P. The control valve 522 is connected to the fluid operable motor 463 and interposed in the lines of connection are a pair of flow controllers 524, 525. Similarly interposed between the lines connecting the rotac 463 and the valve 522 are the deceleration valves 470, 471 which are designed to slow down the movement of the carriage 455 when it reaches either of the end positions. The valves 470, 471 each include flow restrictors 526, 527 and mechanically actuable shoes 528, 529 respectively which are engageable by the carriage 455. Similarly connected across each of the deceleration valves 526, 527 in parallel relationship therewith are flow controllers 530, 531 respectively in the manner as illustrated in FIG. 56. Connected across each of the rotacs 478', 478a' are sequencing valves 532, 533 respectively. The sequencing valves 532, 533 are designed to extend the cylinders 482, 482a and thereby actuate the clamping frames 486, 496, 486a and 496a.

By further reference to FIG. 56, it can be seen that this circuit is capable of controlling the entire operation of the apparatus 300. By the shifting of the valve drum in the control valve 506, it is possible to raise and lower the clamping plate 369 and thereby optionally engage the mandrel M. Furthermore, the carriage is shiftable between each of its end positions by means of actuation of the control valve 522. In addition, the same fluid circuit controls the momentary slow-down and the halting movement of the carriage 455. In essence, as the carriage 455 reaches the end position and contacts either of the shoes 528, 529, the valves 470, 471 will be actuated for slowing down the movement of the carriage 455. When the carirage thereupon reaches the end position and contacts the limit switches 473, 473', the drive motor 463 will be deenergized for stopping the movement of the carriage 455. The mandrel support plates 480 can be rotated through the 90° movements by actuation of the rotacs 478, 478', which are in turn controlled by the control valve 510. In like manner, the cylinders 477, 477a are controlled through actuation of the control valves 515, 516. It can be seen that the fluid locks 519', 520' are also designed to slow down the movement of the pistons 477', 477a' during actuation of the cylinders 477, 477a, respectively. In addition, it can be seen that these fluid locks 519', 520' will prevent any possible creep of the cylinders 477, 477a.

Electrical control circuit

The electrical control circuit 503, which is more fully illustrated in FIG. 57 includes the hydraulic circuit 502 of FIG. 56 and also includes the various motor drives which are employed in the apparatus, such as the electric motors 347 and 358. In addition, the electrical control circuit includes a resin pump 534, which is, in turn, connected to a suitable source of liquid resin or matrix (not shown), and which is, in turn, connected to the resin housing 377 by means of the fluid line 408. The motors 347, 358 and associated drive mechanisms, the resin pump 534 and the hydraulic circuit 502 are all electrically connected to a control console 535 which is mounted on one of the stanchions 303, in the manner as illustrated in FIG. 22.

The electrical control circuit 503 is also provided with a pattern programmer 536, of which the details of construction are conventional. In addition, the electrical circuit 503 includes a thickness position sensing mechanism 537 comprising a circuit which is capable of controlling automatically the number of plys of filament deposited on a surface in any particular wrap cycle. The electrical circuit 503 also includes a wrap position sensing mechanism 538, which comprises a circuit for monitoring the physical limits of the mandrel M or element being wrapped and holding the wrapping of the element in these physical limits. The thickness position sensing mechanism 537 and the wrap position sensing mechanism 538 are in and of themselves conventional, and each of these devices generally includes a series of stepper switches and relays. The sensing mechanisms 537, 538 will transmit the sensed information to the pattern programmer 536. Furthermore, by reference to FIG. 57, it can be seen that the thickness position sensing mechanism 537 and the wrap position sensing mechanism 538 are, in turn, connected to a patch cord pattern panel 539, which is in turn connected to the phototransistor bar or panel 540. A hydraulic position sensing mechanism 539' which includes the various hydraulic limit switches and sensors is also connected to the pattern programmer 536. This pattern programmer 536 is designed to convert the sensed functions from the various position sensing mechanism into a functional control system and into the sequences of operations which are ultimately performed. Furthermore, these are, in turn, controlled by the control console 535.

It can be seen that the major electrical components forming part of the electrical control circuit 503 are only schematically illustrated in FIG. 57 in the form of a block diagram. It is recognized that the various components which make up each of these individual block components in FIG. 57 are naturally more detailed. However, each of these components, as illustrated in FIG. 57, is conventional in and of themselves and therefore, is not described in further detail herein. It is within the competence of the skilled artisan to construct a wiring diagram for connecting each of the aforementioned mechanical and hydraulic components.

The control console 535 includes an upper control panel 540a, a center control panel 540b and a lower control panel 540c. The upper control panel 540a contains switches for operating the various D.C. drives for electric motors. This panel includes a traverse drive switch 541 for regulating the vertically shifting movement of the entire roving feed assembly. A spindle drive switch 542 is also provided for regulating the turning or rotational speed control of the roving feed assembly. Direct reading indicators 543, 544 are provided for each of the spindle and traverse switch drive controls. The direct reading indicator 543 generally reads in inches per minute and the indicator 544 generally reads in revolutions per minute. Furthermore, a traverse speed control 545 and a rotational speed control 546 is also provided for regulating the traverse and rotational movements of the roving feed assembly. In addition, a run ratio control switch 547 and a slow ratio control switch 548 are also provided on the upper control panel 540a. Both of the ratio control switches 547, 548 control the speed of the traverse in relationship to the speed of the spindle. For example, if the spindle is rotated at 25 revolutions per minute and the traverse is shifted at 10 inches per minute, then the spindle can be advanced to 50 revolutions per minute and the traverse will follow to 20 inches per minute. This ratio can be changed at will by the use of either of these ratio controls. In any event, traverse will stay in direct speed relationship to that of the spindle speed.

The control panel 540a is also provided with an automatic switch 549 which provides choices of ratio or manual control. When the switch is in the manual position, the spindle and drive switches 541, 542 may be used independently of each other. When the automatic switch 549 is in the "automatic" position, the two speeds are slaved together by use of the ratio control switches 547, 548. Nevertheless, the traverse speed is still independent of the ratio control until the spindle is rotated. The spindle drive also includes a run switch 550, a jog switch 551 and a stop switch 552. The run switch 550 will start the spindle to the speed preset by the speed control 545. This is a momentary control permitting the spindle to be actuated until the stop button or the emergency stop button hereinafter described is actuated. The jog control switch 551 is a momentary button and must be held in for actuation. This switch 551 will drive the spindle at a very low speed which is preset in the control system. In addition to the above, the upper panel 540a includes a "run-up" switch 553 and a "run-down" switch 554 which determine the direction of travel of the roving feed assembly. Both of these switches 553, 554 will continue to be actuated until the stop switch 552 is energized. In addition, the control panel 540a is provided with a "jog-up" switch 555 and a "jog-down" switch 556, which are also momentary switches. These latter switches will determine the direction which the traverse switch is jogged. A high speed traverse switch 557 mounted on the panel 540a will advance the speed of the traverse drive to the maximum traverse speed regardless of the position of the manual speed control. This high speed traverse switch 557 is a momentary control and is designed to create rapid traverse movement, generally for set-up operation.

The center panel 540b includes a wrap cycle readout 558, a hydraulic control switch 559 and warm-up and power indicators 560. In addition, this panel includes a series of the associated fuses 561. The panel is necessary in order to inform the operator where and at what point the mandrel M is located. Accordingly, the indicators are generally located in three groups such as the wrap indicators, the cycle indicators, and the build-up indicators. The hydraulic control switch, in turn, controls a stability cylinder switch 562, a left table switch 563, a right table switch 564, a mandrel shift switch 565 and a rotate switch 566. The stability cylinder switch operates the cylinder 367 and creates a vertically shifting motion for the purpose of holding the box during winding operations. The right table switch 564 is located on the right side of the mandrel M for holding the mandrel when the latter is in the left position. The mandrel shift switches 565 will shift the carriage 455 either to the left or to the right. Furthermore, the table rotac switch 566 will actuate each of the rotacs for rotating the mandrel support plate 480 in a 90° movement. In addition, the center panel 540b is provided with visual readout indicators such as AC and DC power indicators, warm-up lights, etc. The lower panel contains a main power off-on switch 567 and an emergency stop switch 568. The emergency stop switch 568, when actuated, will deenergize all of the components except for the hydraulic cylinder already in motion when the switch is energized. Also mounted on the lower panel 540c is a system start switch 568', a system reset switch 569 and a resin tank fill switch 570. With regard to the emergency stop switch 568, this switch will not rest the system once it has been energized, and the system will be, in essence, reenergized at the exact position in which it was stopped without losing any of the programmed data. In the event that conditions do not permit the finishing of a winding operation and that the cycle must be stopped by the use of the emergency stop switch 568, the system start switch 568' will permit reenergization of the system and the condition as when it was deenergized. Actuation of the system reset switch 569 after pressing of the emergency stop switch 568 will cause the complete start of a new cycle regardless of the position in which winding was stopped.

OPERATION OF THE FULLY AUTOMATIC WINDING APPARATUS

The operation of many of the mechanical components forming part of the fully automated winding apparatus 300 has been heretofore described. However, the overall operation of the apparatus 300 can be more fully recognized by referring to FIGS. 44–55 showing the orientation of the mandrel M during the various sequences in the winding operation.

The mandrel is placed on one of its transverse end walls in the manner as illustrated in FIG. 44. It is supported on the mandrel support plate 480 as indicated. Thereafter, the support plate 480 of the mandrel support mechanism 474 is extended to engage one of the longitudinal faces of the mandrel M, in the manner as illustrated in FIG. 44. Thereafter, the carriage 455 is rotated 90° to the position as illustrated in FIG. 45, so that the mandrel is located with its longitudinal axis in a horizontal plane. The mandrel support mechanism 475, which is now horizontally disposed, is actuated so that the support plate 480 is retracted. The stabilizing plate 369 is lowered by actuation of the hydraulic cylinder 367 so that it engages the upper planar surface of the mandrel M. In addition, the rotac forming part of the mandrel support mechanism 474 is actuated to rotate the mandrel M through a 90° turn in the manner as illustrated in FIG. 46. In this latter position, the mandrel is in the first winding position.

After the mandrel M has been located in the first winding position, the roving feed assembly is lowered and also rotated so that filament is wrapped around four planar sides of the mandrel to achieve a unidirectional wrap on four planar sides in the manner as illustrated in FIG. 47. After the entire four planar surfaces of the mandrel have been wrapped, it can be shifted to a second winding position in a manner hereinafter described in more detail. However, it should be noted that while in the first winding position, the mandrel can be wrapped with a build-up of filament in selected areas.

In order to shift the mandrel to the second winding position, the stabilizing plate 369 is raised, and the mandrel support mechanism 475 is actuated so that the mandrel support plate 480 engages the side wall of the mandrel M in the manner as illustrated in FIG. 48. After the mandrel M has been stabilized in the position as shown in FIG. 48, the carriage 455 is shifted to the left through a 90° arc so that the mandrel is located in the position as illustrated in FIG. 49. Thereafter, the mandrel support mechanism 474 is actuated so that the mandrel support plate 480a is retracted. At this point, he mandrel M can be rotated 90° in order to achieve the second wrapping position as illustrated in FIG. 50. The stabilizing plate 369 is then lowered to engage the upper planar surface of the mandrel M as illustrated in FIG. 50.

After the mandrel M has been located in the second wrapping position, for wrapping around the second axis of the mandrel, the filament feeding arms 381 are both reciprocatively lowered and raised and rotated about the mandrel M, in the manner as previously described, to provide a wrap about four additional planar surfaces. By reference to FIG. 51, it can be seen that a unidirectional wrap is created on two surfaces which previously remained unwrapped and on two surfaces which had a unidirectional wrap. Consequently, on these latter two surfaces a bidirectional wrap has been achieved. Therefore, it can be seen that after the second winding position the mandrel M has a unidirectional wrap on four planar surfaces and a bidirectional wrap on two planar surfaces thereof. It should also be recognized that any desired type of build-up can be made in the second winding position.

After the winding has been performed on the mandrel M in the second winding position, the mandrel can be shifted to the third winding position by raising the stabilization plate 369. In addition, the mandrel support mechanism 474 is actuated so that the mandrel support plate 480a engages one transverse end of the mandrel M in the manner as illustrated in FIG. 52. After the mandrel has been stabilized in this position, the entire carriage 455 is shifted to the right, through a 90° arc so that the mandrel M is located in the position as shown in FIG. 53. Thereafter, the stabilizing plate 369 can be lowered by actuation of the hydraulic cylinder 367, and the mandrel support plate 480, which is now located in the horizontal plane, can be retracted by actuation of the mandrel support mechanism 475. In addition, the mandrel M is rotated 90° to achieve the third winding position, as illustrated in FIG. 54. In this winding position, the filament feeding arms 381 are again reciprocated and rotated about the mandrel M to achieve a bidirectional wrap on the four additional planar surfaces. Accordingly, it can be seen that the mandrel is provided with a bidirectional wrap on each of the six planar surfaces after completion of the three winding steps. It should also be recognized that any localized desired build-up or entire build-up can be performed in this third winding position.

In order to more fully illustrated the programming system of the apparatus 300, the method of patchcord programming is illustrated in FIGS. 59–63. By referring to FIG. 59, which illustrates one of the containers $C_1$ of the present invention, it can be seen that the container $C_1$ is formed with six planar surfaces having an additional build-up of filament on each of the peripheral edges and corners. In addition, it can also be seen that an additional thickness is built up around the center of four planar surfaces so that the mandrel can be divided into upper and lower sections $S_1$, $S_2$ respectively. Therefore, each of the open-ended boxes formed by the sections $S_1$, $S_2$ will have filament build-up at each of its peripheral margins.

The container $C_1$ includes a first layer of filament and a second layer of filament which is wrapped along a plane, generally perpendicular to the plane of the first layer. This container also includes a third layer, which is wrapped in a plane generally perpendicular to the planes of the first two layers. The container $C_1$ also includes a cured bonding resin of the character previously described, thereby providing rigidity to the layers of filaments. The actual number of layers of the filaments depends, as indicated above, on the desired container wall thickness.

It can thus be seen that a pair of matching container sections $S_1$ and $S_2$, which are substantially identical are formed. The container sections each have top walls 601 with four rectangularly located side walls 602 with peripheral build-ups 603.

In essence, an extra ply is added at each corner during the wrapping cycle for stiffening the edges of the formed containers. The heavy build-up of filament in the center is created so that each of the open edges will have a substantially thick build-up when the container C is parted. After a portion of the center strands have been added so that a somewhat thick build-up is presented in the manner as illustrated in FIG. 61, a removable rubber band 600 can be disposed about the build-up portion in the manner as illustrated in FIG. 62 and additional winding of filament can be deposited on this removable band 600. After the winding around the center portion of the container $C_1$ has been completed, the structure as illustrated in FIG. 60 has been achieved. After the entire container $C_1$ has been wound about the mandrel M to achieve the structure as illustrated in FIG. 60, the container can then be cut along a line substantially through the center of the band 600. This will divide the container $C_1$ into the sections $S_1$, $S_2$. After the container $C_1$ has been split into the two sections $S_1$ and $S_2$, the rubber band is removed, thereby creating U-shaped channels in the center build-up of each of the sections. A metal strip 604 in the form of a tongue is inserted in and sealed into the channel of the upper section $S_1$, and an O-ring, groove forming member 605 is inserted into the U-shaped channel of the lower section $S_2$ and constitutes a receptacle for the tongue 604. When the tongue 604 is inserted into the O-ring groove, an integral fluid-tight seal is achieved.

The pattern for achieving the various windings forming part of the container $C_1$ is more fully illustrated in the various sections of FIG. 63. FIG. 63 actually shows a typical winding program for the machine where a pair of bidirectional plys are applied to all six faces of the mandrel. In addition, the extra ply for stiffening is added at each corner during the cycle and the very heavy build-up is added around the upper and lower edges of the mandrel. In additon, the same heavy build-up is added around the central portion of the mandrel, when the latter is horizontally disposed in order to achieve a container similar to the container $C_1$ of FIG. 59. In order to program the apparatus 300 for production of a new product, the operator starts with a simple sketch of the container, somewhat similar to the three sections illustrated in FIG. 63. The operator can illustrate the wrapping pattern with a sketch similar to that of FIG. 61 or 62. The zig-zag line shown in FIG. 63 illustrates the desired wrap pattern. It can be seen that a single extra ply is wound at the top and bottom corners and a full wrap is wound on the entire length of the mandrel. The same pattern is again repeated in the second winding position of the mandrel and this is again duplicated in the third winding position. In each case, the zig-zag line indicates wrapping-down from the starting point a certain distance, wrapping-up to create the additional ply and down the entire face of the mandrel. This operation is again repeated at the bottom of the mandrel for the extra thick build-up at the lower margin. The arrangement of plug-in phototransistors in FIG. 63 determines the limit points for each of the motions of the winding arms 381.

It can be seen that the phototransistors are arranged in a vertical plug-in array scanning the physical capacities of the machine. This array, as previously indicated, is scanned by the two actuating lights 436, which move in direct relationship with the feed arms 391. The chart of the phototransistor array as shown in the left side of FIG. 63 correlates with the original sketch and relates these to the profile of the box as shown on the right side of FIG. 63. From this sketch, the operator can then see that an extra thick section approximately one inch wide is desired at the top edge. The operator starts by plugging a phototransistor 600 into the array at a dimension representing the top edge of the box. Then one inch down, the operator plugs in phototransistor 601. This simple technique is repeated for each wrap as indicated and is also extended to whatever final build-up pattern may be desired. After all of the phototransistors are plugged in, they are scanned to check against the actual dimensions on the mandrel. This step will then complete this phase of the programming of the apparatus 300.

Thereafter, the operator connects the patchcord panel where he again refers to the original sketch. The panel has receptacles representing the same sixteen photocells in the array and in addition, an upcolumn, a downcolumn, and a termination column. The patchcord panel is also provided with multiplier switches that permit repeating the pattern as many times as desired. This type of patchcord panel is conventional in its construction, and is, therefore, not illustrated in detail herein. Referring to the patchcord panel, which is schematically illustrated in FIG. 57, the operator would plug phototransistor 610 into the downcolumn, and phototransistor 602 into the upcolumn and so on. He would continue this type of plug-in connection until he has completed the program outlined on the sketch. At this point, the apparatus A is ready to be operated on automatically. It can thus be seen that any mistake can be corrected by simply pulling the erring plug and repositioning it.

After the apparatus 300 has been entirely programmed, it can be operated in the manner as previously described for winding about the mandrel M. Thus, it is possible to produce a container of the type illustrated in FIG. 59 or any other type of container, such as the type hereinafter described in more detail.

FIGS. 64–67 illustrate another form of container $C_2$ which can be constructed in accordance with the apparatus and process of the present invention. The container $C_2$ serves as an electronics module package and generally comprises an outer housing 620, which is substantially rectangular in horizontal cross section. The housing 620 is generally provided with an enlarged terminal end portion 621 at its rearward margin and an enlarged terminal portion 622 along its forward margin. The terminal portions 621, 622 are substantially thicker than the side wall 623 of the container $C_2$ and taper downwardly to form an integral bond with the side wall 623 in the manner as illustrated in FIGS. 64 and 65. Rigidly secured or removably secured, as desired, to the rearward margin of the enlarged end portion 621, is a back plate 624, which may also be formed by the process and the apparatus of the present invention. Furthermore, the back plate 624 may be a metallic member which can be secured to the enlarged end portion 621 by a conventional sheet metal screw or other similar fastening means.

The housing 620 is integrally provided with pairs of upper and lower inwardly extending protuberances 625 which form a pair of longitudinally extending channels 626, sized to accommodate the rails of conventional electronic module packages, in the manner as illustrated in FIGS. 65 and 66. The channels 626 are sized so that they will removably accommodate conventional rails of such equipment, and hold the package in a fairly rigid manner within the housing 620. The package may be conventionally provided with a front wall 627, or the front wall 627 may be provided as a removable element in the manner similar to the rear wall 624. The forward and rearward margins of the enlarged portions 621, 622 is provided with annular outwardly extending somewhat resilient sheet metal strips 628 in the manner as illustrated in FIG. 66. The strips 628 are designed to engage the forward margin of the front wall 627 and the rear wall 624 for maintaining electrical conductivity throughout the entire housing 620 and thereby removably hold the same in the closed position.

The container $C_2$ is formed in the same manner as the previously described container $C_1$ and includes along the annular side wall 623 a pair of bidirectional plys, one of which is located in a plane perpendicular to the other. As a matter of practice, the housing 620 may be formed as an integral unit on a substantially rectangularly shaped mandrel with additional build-up to create the enlarged terminal end portions 621, 622. Thereafter, the rear wall 624 may be removed from the housing 620 by cutting the same, possibly along a scored line (not shown) formed in the mandrel. Similarly, the front wall 627 may be removed in the same manner. The inwardly extending flanges 625 can be formed by winding the filament along recesses formed in the mandrel itself. In like manner, the apertures in the enlarged portions 621, 622 are necessary to accommodate the strips 628. They may be formed in the manner similar to the creation of the channels in the container $C_1$.

As indicated above, the strips may serve as a bonding strip used to insure electrical bonding around both the front and back closures. By further reference to FIGS. 66 and 67, it can be seen that the plys also include spaced strands of copper magnet wire. The copper wire is fed through the feeding arm 22 with the fiberglass filament as the mandrel is wrapped. This creates a multilayered screen throughout the entire structure of the package. Furthermore, it creates a magnetically shielded package with a plurality of copper wire interposed between the filament winding.

It is also possible to produce the same type of electronic package with a slightly different construction. In this case, a first layer of fiberglass is wound upon the mandrel and this is followed by a layer of copper winding. Thereafter, an additional layer of filament is placed on the outer surface of the copper winding. The end portions of the container may then be built up in the same manner as the container $C_2$.

FIG. 68 illustrates yet another type of container $C_3$ which may also be constructed in accordance with the apparatus and the process of the present invention. The container $C_3$ illustrates the method of structurally reinforcing a molded container. In the container $C_3$, an acid bottle 640, preferably formed of polyethylene has been blow molded and is formed in a rectangular shape. The blow molded container $C_3$ in this particular case actually serves as the mandrel itself and the filament is wound upon the container to produce a structure as illustrated in FIG. 68. It can be seen that the corners and margins of the polyethylene is reinforced by two or more plys of fiberglass. Accordingly, this creates an acid container $C_3$ with sufficient structural strength to allow stacking and to sustain the abuse normally subjected thereto during handling. Furthermore, a handle not shown may also be formed with the container $C_3$.

It is possible to provide another modified form of container $C_4$ which is more fully illustrated in FIG. 69. The container $C_4$ is formed in a manner similar to the formation of the container $C_1$. However, the filament strands are laid in a pattern so that a plurality of spaced filament bands are formed in the manner as illustrated in FIG. 69.

The filament winding apparatus is programmed so that a type of helical pattern is wrapped about the mandrel. After winding about four rectangularly located planar sides of the mandrel in this helical pattern, the mandrel is reoriented into the second winding position. Winding the filament strands and helical patterns in the second winding position and in the third winding position forms a total box-like structure enclosed in a helical wrap. The windings are locally reinforced at the margins and a broad winding band is lid along the center of four planar sides. After the winding has been completed, an annular cut is made along the reinforced center band to divide the structure on the mandrel into two container section $C_4$.

It can be seen that the container $C_4$ is formed with a bottom wall 650 reinforced by an annular band 651. The container is also provided with four vertical walls consisting of rectangularly located bands 652 thereby forming rectangular apertures 653. Each of the vertical walls are locally reinforced at 654 and are provided at their upper margins with locally reinforced annular bands 655. The bands 655 are cut away in the provision of band engaging apertures 656.

It can be seen that this type of filament reinforced structure is quite unique in that it is possible to form a box-like structure which has a substantial portion of the strength that a completely enclosed filament reinforced box structure would have. It has the increased advantage of lighter weight and lower cost of materials. Furthermore, this type of structure, due to its strength, is far superior to similar types of basket-weave structures formed of other materials of construction.

The above containers $C_1$–$C_4$ are merely illustrative of the type of containers which can be produced by the apparatus and process of the present invention. However, these containers adequately illustrate the versatility of the apparatus and of the method and provide almost limitless possibility of filament wound containers.

It should be understood that changes and modifications could be made in the form, construction, arrangement and combination of parts presently described and pointed out in the claims without departing from the nature and principle of my invention.

Having thus described my invention, what I desire to claim and secure by Letters Patent is:

1. Process for forming a container having three pairs of opposed generally rectangular relatively flat walls comprising the steps of: supporting a mandrel having three pairs of opposed generally rectangular exterior planar walls on the lowermost of the walls of a first pair of vertically spaced-apart walls thereof, holding said mandrel in a non-rotatable position when supported on said lowermost wall of said first pair thereof so that an axis passing through at least one of said second and third pairs of walls is located in a horizontal first plane relatively parallel to said first pair of walls, reciprocatively shifting and simultaneously rotating a filament feeding member with respect to said mandrel to wind continuous filament under tension about the second and third pairs; of walls of said mandrel creating a first shell layer composed of the filament, orienting said mandrel so that said axis is located in a second plane which is perpendicularly disposed with respect to said first plane so that a second pair of said walls are located in vertically spaced-apart relationship, supporting said mandrel on the lowermost wall of said second pair of vertically spaced-apart walls thereof, holding said mandrel in a non-rotatable position when said axis is located in said second plane and when supported on the lowermost wall of said second pair of vertically spaced-apart walls thereof, reciprocatively shifting and simultaneously rotating said filament feeding member with respect to said mandrel to wind continuous filament under tension about the walls of said first and third pair of walls of said mandrel thereby forming a container shell comprised of the filaments, impregnating the filament with a bonding agent, and curing the bonding agent after impregnation of said filament, thereby forming a container having an interior surface conforming to the exterior walls of said mandrel.

2. The process of forming a container of claim 1 further characterized in that said first, second and third pair of walls are substantially perpendicular in space with respect to each other.

3. The process of forming a container of claim 2 further characterized in that the axis passing through a pair of planar walls is located in a third plane which is relatively perpendicularly disposed with respect to said first and second planes so that said third pair of walls is located in vertically spaced-apart relationship, supporting said mandrel on the lowermost wall of said third pair of vertically spaced-apart walls thereof, holding said mandrel in a non-rotatable position when said axis is located in said third plane, and reciprocatively shifting and simultaneously rotating the filament feeding member with respect to said mandrel to wind continuous filament under tension about said first and second pairs of walls of said mandrel.

4. The process of forming a container of claim 3 further characterized in that said first plane is a horizontal plane, said second plane is a horizontal plane which is angularly disposed with respect to said first plane, and said third plane is a vertical plane.

5. The process of forming a container of claim 1 further characterized in that said winding steps in which the filament feeding member is reciprocatively shifted and simultaneously rotated with respect to said mandrel are repeated in cyclical fashion to build up the desired container wall thickness.

6. The process of forming a container of claim 1 further characterized in that the thickness of the container walls are varied by changing the relative speeds of the reciprocative movement and rotational movement of the filament feeding member with respect to said mandrel.

7. The process of forming a container of claim 1 further characterized in that said filament is impregnated with said bonding agent prior to winding onto said mandrel.

8. The process of forming a container of claim 1 further characterized in that said filament is impregnated with said bonding agent after formation of the container shell on the mandrel.

9. The process of forming a container of claim 1 further characterized in that said filament is wrapped around at least one wall having a layer of filament thereon when said axis is located in the second plane thereby causing a bi-directional wrap.

10. Process for forming a container having at least three pairs of opposed generally rectangular planar walls comprising the steps of: supporting a mandrel having at least first, second and third pairs of opposed generally rectangular planar walls in which each pair is perpendicular to the others on the lowermost wall of said first pair of walls when in vertically spaced-apart relationship, holding said mandrel in a non-rotatable position when supported on the lowermost wall of said first pair thereof so that an axis passing through one of said second and third pairs of walls is located in a horizontal first plane relatively parallel to said first pair of walls, reciprocatively shifting and simultaneously rotating a filament feeding member with respect to said mandrel to wind continuous filament under tension about the second pair of planar walls and about the third pair of planar walls, locating said axis in a second plane which is angularly disposed with respect to the first plane to thereby position said second pair of walls in a vertically spaced relationship, supporting said mandrel on the lowermost wall of said second pair of walls when in said vertically spaced-apart relationship, holding said mandrel in a non-rotatable position on the lowermost wall of said second pair of walls, reciprocatively shifting and simultaneously rotating said filament feeding member with respect to said mandrel to wind continuous filament under tension about the third pair of planar walls creating a bi-directional wrap thereon and about the first pair of planar walls, locating said axis in a third plane which is angularly disposed to said first and second planes to thereby position said third pair of walls in a vertically spaced relationship, supporting said mandrel on the lowermost wall of said third pair of walls when in said vertically spaced relationship, holding said mandrel in a non-rotatable position on the lowermost wall of said third pair of walls, reciprocatively shifting and rotating said filament feeding member with respect to said mandrel to wind continuous filament under tension about the second and third pairs of planar walls to create a bi-directional wrap on said second and third pairs of planar walls, impregnating the filament with a matrix curable material, and curing the matrix curable material after impregnation of the filament, thereby forming a container having an interior surface conforming to the exterior walls of said mandrel.

11. The process of claim 10 further characterized in that the filament is impregnated with a matrix curable material prior to winding onto said mandrel.

12. The process of claim 10 further chaarcterized in that said filament is impregnated with said matrix curable material after said container shell is formed on said mandrel.

13. The process of claim 10 further characterized in that portions of the container are locally reinforced with additional layers of filament by winding additional layers of filament at these portions of the container.

14. The process of claim 13 further characterized in that the local areas are areas adjacent to the peripheral margins of the container.

15. Process for forming a container having three pairs of opposed generally rectangular planar walls comprising the steps of: supporting a mandrel having three pairs of opposed generally rectangular, planar walls in which each pair is perpendicular to the others, by engaging a first pair of the mandrel walls with a pair of supports; helically winding a continuous filament under tension about the second and third pairs of mandrel walls; disengaging the supports from the first pair of walls and engaging the third pair of mandrel walls at a point displaced along one transverse axis of each third wall from the midpoints of the third walls whereby the mandrel is rotated about 90 degrees by gravitational force and the second pair of walls is positioned adjacent the supports; supporting the mandrel by engaging the second pair of walls with said supports; helically winding a continuous filament under tension about the first and third pairs of mandrel walls; disengaging the supports from the second pair of walls and engaging the first pair of mandrel walls at a point displaced along one transverse axis of each first wall from the midpoints of the first walls whereby the mandrel is rotated about 90 degrees by gravitational force and the third pair of walls is positioned adjacent the supports; supporting the mandrel by engaging the third pair of walls with said supports; helically winding a continuous filament under tension about the first and second pairs of mandrel walls, thereby completing a bidirectional filament wrap on each of the mandrel walls; impregnating the filament with a bonding agent; and curing the bonding agent, thereby forming a container having an interior surface conforming to the walls of the mandrel.

16. Process for forming a container having three pairs of opposed generally rectangular planar walls comprising the steps of: supporting a mandrel having three pairs of opposed generally rectangular, planar walls in which each pair is perpendicular to the others, by engaging a first pair of the mandrel walls with a pair of supports; winding a continuous filament under tension about the second and third pairs of mandrel walls; disengaging the supports from the first pair of walls and engaging the third pair of mandrel walls at a point displaced along one transverse axis of each third wall from the midpoints of the third walls whereby the mandrel is rotated about 90 degrees by gravitational force and the second pair of walls is positioned adjacent the supports; supporting the mandrel by engaging the second pair of walls with said supports; winding a continuous filament under tension about the first and third pairs of mandrel walls; disengaging the supports from the second pair of walls and engaging the first pair of mandrel walls at a point displaced along one transverse axis of each first wall from the midpoints of the first walls whereby the mandrel is rotated about 90 degrees by gravitational force and the third pair of walls is positioned adjacent the supports; supporting the mandrel by engaging the third pair of walls with said supports; winding a continuous filament under tension about the first and second pairs of mandrel walls, thereby completing a bidirectional filament wrap on each of the mandrel walls; impregnating the filament with a bonding agent; and curing the bonding agent, thereby forming a container having an interior surface conforming to the walls of the mandrel.

17. Process for forming a container having three pairs of opposed generally rectangular planar walls comprising the steps of: supporting a mandrel having three pairs of opposed generally rectangular, planar walls in which each pair is perpendicular to the others, by engaging at least one wall of a first pair of the mandrel walls with at least one of a pair of supports; winding a continuous filament under tension about the second and third pairs of mandrel walls; disengaging the support from the wall of the first pair of walls and engaging the third pair of mandrel walls at a point displaced along one transverse axis of each third wall from the midpoints of the third walls permitting the mandrel to rotate about 90 degrees and the second pair of walls is positioned adjacent the supports; supporting the mandrel by engaging at least one wall of the second pair of walls with one of said supports; winding a continuous filament under tension about the first and third pairs of mandrel walls; disengaging the support from the wall of the second pair of walls and engaging the first pair of mandrel walls at a point displaced along one transverse axis of each first wall from the midpoints of the first walls permitting the mandrel to rotate about 90 degrees and the third pair of walls is positioned adjacent the supports; supporting the mandrel by engaging at least one wall of the third pair of walls with one of said supports; winding a continuous filament under tension about the first and second pairs of mandrel walls, thereby completing a bidirectional filament wrap on each of the mandrel walls; impregnating the filament with a bonding agent; and curing the bonding agent, thereby forming a container having an interior surface conforming to the walls of the mandrel.

References Cited

UNITED STATES PATENTS

| | | | |
|---|---|---|---|
| 2,731,376 | 1/1956 | Rusch | 156—175 |
| 3,263,309 | 8/1966 | Carman | 29—155.57 |
| 3,074,585 | 1/1963 | Koontz | 220—83 |
| 2,843,156 | 7/1958 | Young | 156—175 |
| 2,107,067 | 2/1938 | Alderfer | 156—175 |
| 2,966,935 | 1/1961 | Wiltshire | 156—172 |

OTHER REFERENCES

B. Goldsworthy, Model BWM-24 Filament Winding Machines, February 1963, pp. 1–20.

D. J. FRITSCH, Primary Examiner

U.S. Cl. X.R.

156—175, 425, 446